(12) United States Patent
Rajan et al.

(10) Patent No.: US 6,272,934 B1
(45) Date of Patent: Aug. 14, 2001

(54) MULTI-PHASE FLUID FLOW MEASUREMENT APPARATUS AND METHOD

(75) Inventors: Varagur Srinivasa V. Rajan, Sherwood Park; Rodney Keith Ridley, Edmonton, both of (CA)

(73) Assignee: Alberta Research Council Inc., Alberta (CA)

(*) Notice: Subject to any disclaimer, the term of this patent is extended or adjusted under 35 U.S.C. 154(b) by 0 days.

(21) Appl. No.: 09/246,300

(22) Filed: Feb. 8, 1999

Related U.S. Application Data

(63) Continuation-in-part of application No. 08/740,015, filed on Oct. 23, 1996, now Pat. No. 5,869,771.

(30) Foreign Application Priority Data

Sep. 18, 1996 (CA) .................................................... 2185867

(51) Int. Cl.[7] ....................................................... G01F 1/74
(52) U.S. Cl. ...................................... 73/861.04; 73/861.63
(58) Field of Search ........................... 73/861.04, 861.01, 73/861.02, 861.03, 861.63, 195

(56) References Cited

U.S. PATENT DOCUMENTS

| | | |
|---|---|---|
| 3,176,511 | 4/1965 | Widmyer . |
| 3,926,050 | 12/1975 | Turner et al. . |

(List continued on next page.)

FOREIGN PATENT DOCUMENTS

| | | |
|---|---|---|
| 911203 | 10/1970 | (CA) . |
| 1134174 | 10/1982 | (CA) . |
| 2063820 | 1/1991 | (CA) . |
| 2103254 | 9/1993 | (CA) . |
| 2217663 | 4/1998 | (CA) . |
| 2815651A | 10/1979 | (DE) . |
| 0690292A2 | 1/1996 | (EP) . |
| 2128756 | 5/1984 | (GB) . |
| WO95/33980 | 12/1995 | (WO) . |
| WO96/09880 | 4/1996 | (WO) . |

OTHER PUBLICATIONS

*Chemical Engineering*, vol. 2 Unit Operations by J.M. Coulson and J.F. Richardson, 1962, Pergamon Press, pp. 21–24.

(List continued on next page.)

*Primary Examiner*—Benjamin R. Fuller
*Assistant Examiner*—Jewel V. Thompson
(74) *Attorney, Agent, or Firm*—Rodman & Rodman

(57) ABSTRACT

The invention is an apparatus and a method for characterizing the flow of a multi-phase fluid. The fluid is first mixed continuously as it flows from a first to a second end of a first section, such that the fluid is substantially homogeneous at a first point and such that the substantial homogeneity of the fluid is maintained between the first point and a second point in the first section, and a first pressure drop is measured at a first location in the first section between the first and second points. The fluid is second mixed continuously as it flows from a first to a second end of a second section, such that the fluid is substantially homogeneous at a first point and such that the substantial homogeneity of the fluid is maintained between the first point and a second point in the second section, and a second pressure drop is measured at a second location in the second section between the first and second points. Using the first and second pressure drops, a value is determined for a first characteristic and a second characteristic of the fluid. Optionally, the fluid may also be third mixed continuously as it flows from a first to a second end of a third section, such that the fluid is substantially homogeneous at a first point and such that the substantial homogeneity of the fluid is maintained between the first point and a second point in the third section, and a third pressure drop may then be measured at a third location in the third section between the first and second points. A value for a third characteristic of the fluid may be determined by using the third pressure drop.

58 Claims, 4 Drawing Sheets

U.S. PATENT DOCUMENTS

| | | |
|---|---|---|
| 4,061,313 | 12/1977 | Brauner et al. . |
| 4,168,624 | 9/1979 | Pichon . |
| 4,203,935 | 5/1980 | Hackenjos . |
| 4,417,474 | 11/1983 | Elderton . |
| 4,441,361 | 4/1984 | Carlson et al. . |
| 4,753,106 | 6/1988 | Brenner et al. . |
| 4,815,536 | 3/1989 | Prendergast et al. . |
| 4,829,831 | 5/1989 | Kefer et al. . |
| 4,856,344 | 8/1989 | Hunt . |
| 4,974,452 | 12/1990 | Hunt et al. . |
| 5,051,922 | 9/1991 | Toral et al. . |
| 5,190,103 | 3/1993 | Griston et al. . |
| 5,400,657 | 3/1995 | Kolpak . |
| 5,501,099 | 3/1996 | Whorff . |
| 5,608,170 | 3/1997 | Atkinson et al. . |
| 5,641,915 | 6/1997 | Ortiz et al. . |
| 5,708,211 | 1/1998 | Jepson et al. . |
| 5,770,068 * | 6/1998 | Jepson .................................. 210/741 |
| 5,822,390 | 10/1998 | Hewitt et al. . |

OTHER PUBLICATIONS

Hayward, A.T.J., "In–Line Mixing Devices," International Oyez–IBC Ltd. Conference on Recent Developments in the Custody Transfer Measurement of Crude Oil, London, U.K. (Nov. 3–4, 1982) pp. 99–109 and 111–116.

Darwich, T.D.A., "A Statistical Method for Two–Phase Flow Metering," Imperial College of Science, Technology and Medicine, University of London, Jan. 1989, pp. 27–57.

Martin. W.W. et. al., "A Proven Oil/Water/Gas Flow Meter for Subsea" presented at the 23rd annual OTC in Houston, Texas, May 6–9, 1991, (20 pp.).

"Tri–Packs Column Packing," Catalogue, Fabco Plastics, Section 8, p.34, Buyer's Guide (1990–91).

Beg N.A. and Toral H., "Off–Site Calibration of a Two–Phase Pattern Recognition Flowmeter," *Int. J. Multiphase Flow* vol. 19, No. 6, Aug. 1993, pp. 999–1012.

Rajan, V.S.V., Ridley, R.K. and Rafa, K.G., "Multiphase Flow Measurement Techniques–A Review," *J. Energy Resources Technology*, vol. 115, No. 3, PP. 151–161 (1993).

Jaeger Tri–Packs, Inc. advertising materials and product bulletins dated Aug. 12, 1994 entitled "Tri–Packs—The Most Efficient and Cost Effective Column Packing," 4 pages.

Roach, G.J. et. al., "Current Status of Development of the CSIRO Gamma–Ray Multiphase Flow Meter" presented to the North Sea Flow Measurement Workshop Oct. 28–31, 1996 (13 pages).

Hong, K.C. and Griston S., "Best Practice for the Distriburion and Metering of Two–Phase Steam," *SPE Production & Facilities* Aug. 1997, pp. 173–180.

Mohamed, P.G. et. al., "Field Trial of a Multiphase–Flow Meter," *Journal of Petroleum Technology*, Oct. 1998, pp. 74–75.

Letton, W., "Multiphase–Flowmeter Experience," *Journal of Petroleum Technology*, Apr. 1998, pp. 84–86.

*Perry's Chemical Engineers Handbook*, 6th Ed., McGraw–Hill Book Company, pp. 18–19, 18–20, 18–22 and 18–25, Robert H. Perry (Editor).

Kay–Ray/Sensall Inc. materials, undated, entitled "Kay–Ray Non–Contacting Measurement Systems," 4 pages.

Stokes, E. G., "Metering Multiphase Flow in the Gulf of Mexico" *Journal of Petroleum Technology*, vol. 51, No. 3, Mar. 1999, pp. 64 and 66.

* cited by examiner

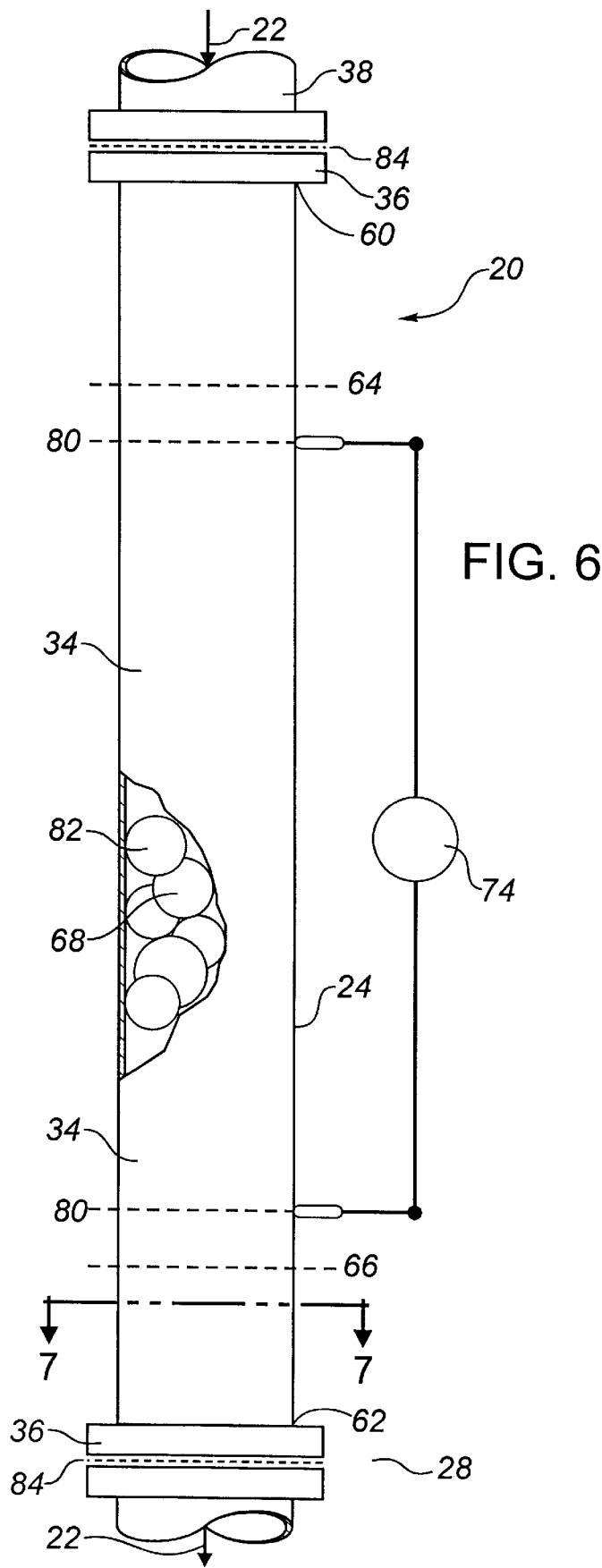
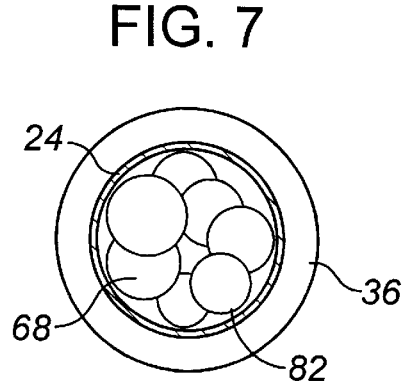

MULTI-PHASE FLUID FLOW MEASUREMENT APPARATUS AND METHOD

CROSS-REFERENCE TO RELATED APPLICATION

This is a continuation-in-part of U.S. patent application Ser. No. 08/740,015 filed Oct. 23, 1996 now U.S. Pat. No. 5,869,771 and which claims the priority of Canadian Patent Application No. 2,185,867 filed Sep. 18, 1996.

TECHNICAL FIELD

The present invention relates to a method and an apparatus for characterizing the flow of a multi-phase fluid, including determining a value for at least a first characteristic and a second characteristic of the fluid.

BACKGROUND ART

The characterization or measurement of the flow of a multi-phase fluid presents numerous difficulties. A multi-phase fluid is a fluid having more than one phase (liquid or gas), such as a fluid having two or more liquid phases or a combination of a gas phase with one or more liquid phases. Attempts have been made to overcome these difficulties given the recognized need in industrial applications for the accurate characterization or measurement of the flow of such multi-phase fluids. For example, the oil and gas industry requires accurate measurement of the production of multi-phase fluids, comprising oil, hydrocarbon gases, water and/or other associated fluids, from underground reservoirs through wells in order that the production from each well can be assessed, managed and allocated in a reliable and consistent manner. In addition to the oil and gas industry, similar needs exist in other industries such as the chemical industry.

Generally, measurement of the flow of a multi-phase fluid presents difficulties due to the wide variety of flow regimes which are possible, general flow instability and the likelihood of a slip between the phases of the fluid due to segregation. For example, in a production well, the multi-phase fluid is likely comprised of oil, water and hydrocarbon gas. A slip may occur between the oil and water resulting in the production of separate slugs or plugs of oil and water. Meanwhile, the gas may take the form of small bubbles, large slugs of gas or a discrete layer of gas above the water and oil. A slip may also occur between the liquid phase and the gas phase and is more likely.

The conventional approach of industry to the characterization of multi-phase fluid flows is fluid sampling and separation. A sample of the multi-phase fluid is diverted from the flow and allowed to separate into its component phases. Once separated, measurements may be made of the individual phases using conventional single-phase flow measurement techniques and devices. This conventional approach has several drawbacks. Sampling requires the extraction of a quantity of the fluid, on either a continuous or a periodic basis, by an intrusive sampling probe. As well, homogenization of the flow may be required prior to sampling in order to obtain a representative sample of the fluid. Further, sampling and separation of the phases may be time consuming and the required equipment may be costly, bulky, complex and require ongoing maintenance. Thus, the efficiency and economics of conventional field fluid samplers and separators have not been found to be completely satisfactory.

Alternatively, Canadian Patent No. 1,134,174 issued Oct. 26, 1982 to Rhodes et al is directed at a device which measures the flow of a multi-phase fluid without sampling and separation of the phases. Rhodes describes a flow meter which is designed to measure the individual flow rates of the phases of the fluid by measuring a frictional pressure drop and an accelerational pressure drop of the fluid. The frictional pressure drop is measured across a twisted tape in a conduit carrying the flow, while the accelerational pressure drop is measured across a venturi positioned in the conduit downstream of the twisted tape. However, this device does not completely address the problems associated with the variable flow regimes, flow instability and slip in multi-phase fluid flows.

However, specific attempts have been made to address these problems as shown by Canadian Patent Application No. 2,103,254 filed by Farchi et al and published Sep. 18, 1993, U.S. Pat. No. 3,176,511 issued Apr. 6, 1965 to Widmyer, U.S. Pat. No. 4,168,624 issued Sep. 25, 1979 to Pichon, U.S. Pat. No. 4,441,361 issued Apr. 10, 1984 to Carlson et al, U.S. Pat. No. 4,856,344 issued Aug. 15, 1989 to Hunt, U.S. Pat. No. 4,974,452 issued Dec. 4, 1990 to Hunt et al and U.S. Pat. No. 5,190,103 issued Mar. 2, 1993 to Griston et al.

Farchi describes an apparatus for measuring the flow rates of the gas and liquid components of a fluid in a series flow path. Farchi states that the velocity ratio between the gas and the liquid in the series flow path is preferably maintained at a known value, such as one, by using either a first and second mixer or a positive displacement flow meter. The first and second mixers are coupled at the input and output of the volumetric flow meter. However, the specific method by which the velocity ratio is effectively maintained at one through the volumetric flow meter is not described. Further, no definition or description of the positive displacement flow meter, or the method by which it maintains the velocity ratio, is provided by Farchi.

Widmyer provides for a measuring apparatus which includes a plurality of baffle plates which form the walls of a tortuous passageway for the fluid. The fluid passes through the passageway, where it is mixed, and subsequently through a partition and into a separate fluid density measuring device. The fluid then passes through a second partition into a separate flow rate or volume measuring device. Similarly, each of Pichon, Carlson, Hunt, Hunt et al and Griston all describe devices which discuss the use of a mixer or other means, for making the fluid flow substantially uniform, which mixer is located upstream of the particular measuring devices or flow meters used in each device.

In addition, further attempts to overcome these problems are also shown by European Patent No. EP 0690292A2 by Marelli et. al. published Jan. 3, 1996, German Patent No. DE 2815651A by Yxzet published Oct. 25, 1979 and U.S. Pat. No. 4,061,313 issued Dec. 6, 1977 to Brauner et. al.

Marelli et. al. describes a device which provide a monitoring device, being a water cut monitor, located downstream of a static mixer. Thus, the mixing of the multi-phase fluid by the static mixer ceases prior to the passage of the multi-phase fluid through the monitoring device. Since the mixing of the fluid ceases upstream of the monitoring device, the fluid passing through the monitoring device has an opportunity to segregate or separate such that the fluid being monitored may not be completely homogeneous.

Yxzet also describes a stationary mixing apparatus for flowable substances. More particularly, the apparatus is comprised of a tubular housing containing packing bodies, which are preferably comprised of a plurality of spheres. The packing bodies may be densely or loosely packed as required for the particular mixing process. Further, at least one vibrator is associated with the housing for setting the packing bodies in motion. The vibrator may be internal or external to the housing and may be comprised of a jolting machine, an electromagnetic oscillator or the like. However, Yxzet does not describe or provide for the measurement of the flowable substance at any time before, during or after the passage of the flowable substance through the mixing apparatus.

Brauner et. al. is similarly directed at an apparatus for the static mixing of flowable substances. Specifically, the static mixer comprises a tubular housing having a mixing insert arranged therein, consisting of a plurality of plates having webs in intersecting planes inclined to the axis of the housing. As in Yxzet, Brauner et. al. does not describe or provide for the measurement of the flowable substance at any time before, during or after the passage of the flowable substance through the static mixing apparatus.

Each of these patents either describes the mixing of the flow of the multi-phase fluid, without describing the taking of any measurements thereof, or describes the mixing of the flow of the multi-phase fluid prior to the taking of any measurements so that the fluid may subsequently be measured by means suitable for a single-phase fluid. However, although these patents attempt to address the problems of varying flow regimes, flow instability and slip, these problems may not be completely overcome by the devices and techniques disclosed by these patents.

As stated, all of the devices and techniques disclosed by these patents attempt to achieve uniformity in the flow of the multi-phase fluid by mixing the segregated phases. Further, in the event both mixing and measuring of the fluid are described, the mixing of the segregated phases occurs prior to the taking of any measurements of it. As a result, partial resegregation or separation of the phases will occur immediately following cessation of the mixing of the phases, or once the fluid has passed through the mixer, due to the immiscibility and differences in the densities (buoyancy or gravity segregation effect) of the fluid phases.

Thus, the fluid flow subsequently measured by each of the disclosed measuring devices is not uniform or homogeneous, but rather, it is partially or completely segregated or separated into its component phases. This partial or complete segregation of the phases of the fluid flow can cause inaccuracies in the measurements being made, particularly when using measurement devices and techniques conventionally used for single-phase fluids. Conventional single-phase fluid flow measurement devices and techniques are feasible and provide relatively accurate measurements only when the multi-phase fluid flow is homogeneous or substantially uniform.

There is therefore a need in the industry for an improved method and an improved apparatus for relatively accurately characterizing the flow of a multi-phase fluid. As well, there is a need for a method and a device capable of characterizing the multi-phase fluid flow using conventional single-phase fluid flow measuring devices and techniques. Further, the device is preferably relatively compact and simple and relatively economical and easy to construct and use in the field.

SUMMARY OF THE INVENTION

The present invention relates to a method and an apparatus for characterizing the flow of a multi-phase fluid in which the fluid is simultaneously mixed and measured so that the measurement is made while the fluid is substantially homogeneous In particular, the invention relates to a method and apparatus in which the fluid is simultaneously mixed and measured under at least two different flow conditions in order to determine more than one characteristic of the fluid. The different flow conditions may relate to the flow rate of the fluid or to the orientation of flow relative to gravity. These flow conditions can be altered by changing the "geometry" of the flow of the fluid.

Preferably, the flow of the fluid is characterized as it flows through a conduit, in which case the "geometry" of the flow of the fluid is altered either by changing the cross-section of the conduit or by changing the orientation of the conduit relative to gravity.

In a method form of the invention, the invention relates to a method for characterizing the flow of a multi-phase fluid as the fluid flows through a conduit, the conduit comprising a first section and a second section in series, wherein the first section and the second section each have a first end and a second end, the method comprising the steps of:

(a) first mixing the fluid continuously as it flows from the first end to the second end of the first section of the conduit such that the fluid is substantially homogeneous at a first point in the first section and such that the substantial homogeneity of the fluid is maintained between the first point and a second point in the first section, wherein the first point and the second point are located between the first end and the second end of the first section;

(b) measuring a first pressure drop at a first location in the first section of the conduit between the first point and the second point of the first section, wherein the first location has a geometry;

(c) second mixing the fluid continuously as it flows from the first end to the second end of the second section such that the fluid is substantially homogeneous at a first point in the second section and such that the substantial homogeneity of the fluid is maintained between the first point and a second point in the second section, wherein the first point and the second point are located between the first end and the second end of the second section;

(d) measuring a second pressure drop at a second location in the second section of the conduit between the first point and the second point of the second section, wherein the second location has a geometry different from the geometry of the first location; and (e) using the first pressure drop and the second pressure drop to determine a value for a first characteristic of the fluid and to determine a value for a second characteristic of the fluid.

In an apparatus form of the invention, the invention relates to an apparatus for use in characterizing the flow of a multi-phase fluid, the apparatus comprising:

(a) a conduit comprising a first section and a second section in series, wherein each section has a first end and a second end for flowing the fluid through each section in series from the first end to the second end, and wherein the first section and the second section each have a first point and a second point located between the first end and the second end;

(b) a first mixer for mixing the fluid continuously as it flows from the first end to the second end of the first section such that the fluid is substantially homogeneous at the first point in the first section and such that the substantial homogeneity of the fluid is maintained between the first point and the second point in the first section;

(c) a first pressure drop measuring device at a first location in the first section between the first point and the second point of the first section, wherein the first location has a geometry;

(d) a second mixer for mixing the fluid continuously as it flows from the first end to the second end of the second section such that the fluid is substantially homogeneous at the first point in the second section and such that the substantial homogeneity of the fluid is maintained between the first point and the second point in the second section; and (e) a second pressure drop measuring device at a second location in the second section between the first point and the second point of the second section, wherein the second location has a geometry different from the geometry of the first location The fluid may be mixed in any manner during the mixing steps. Preferably the first mixing step is comprised of directing the fluid through a first mixer located in the first section to produce the substantially homogeneous fluid at the first point in the first section and to maintain the substantial homogeneity of the fluid between the first point and the second point in the first section. Preferably the second mixing step is comprised of directing the fluid through a second mixer located in the second section to produce the substantially homogeneous fluid at the first point in the second section and to maintain the substantial homogeneity of the fluid between the first point and the second point in the second section. The first mixer and the second mixer may each be comprised of any type of mixer. Preferably either or both of the first mixer and the second mixer are comprised of at least one in-line mixer.

Preferably the in-line mixer in at least one of the first section and the second section is comprised of a static mixer. Most preferably, the in-line mixer in each of the first section and the second section is comprised of a static mixer. Preferably the static mixers extend substantially between the first and second ends of the first and second sections respectively.

Any type of static mixer may be used in the invention. Preferably, the static mixer is chosen to minimize the pressure drop through the static mixer in order to minimize energy loss, while at the same time providing sufficient pressure drop to facilitate measurement. Preferably the static mixer in either or both of the first section and the second section is comprised of a packing material for disrupting the flow of the fluid. Although any type of packing material may be used, a preferred packing material is comprised of a plurality of permeable ellipsoidal bodies.

The first pressure drop measuring step and the second pressure drop measuring step may be conducted in any manner which will provide a first pressure drop and a second pressure drop respectively which can be measured by a pressure drop measuring device. For example, the pressure drop may be measured through a venturi nozzle, across an orifice plate or by using some other apparatus. Preferably, however, the pressure drop measuring steps involve using first and second pressure drop measuring devices to measure the pressure drops experienced by the fluid as it passes through the first and second mixers.

Any type of pressure drop measuring device may be used to measure the pressure drops during the pressure drop measuring steps. Preferably, however, either or both of the first and second pressure drop measuring devices are differential pressure drop measuring devices so that measurement of the absolute pressure of the fluid can be avoided.

The first and second pressure drops experienced by the fluid are measured at the first and second locations respectively. Each of the first location and the second location has a geometry and the geometry of the first location is different from the geometry of the second location so that more than one characteristic of the fluid can be determined.

The geometries of the first and second locations may differ due to the flow rate of the fluid or due to the orientation of the flow relative to gravity. The flow rate of the fluid may be varied by changing either or both of the actual cross-sectional area of the conduit and the effective cross-sectional area of the conduit. The effective cross-sectional area through the conduit may be altered without changing the actual cross-sectional area of the conduit by changing the type of mixer or by altering the packing in a static mixer.

The orientation of the flow relative to gravity may be varied by changing the relative elevations of the points between which the pressure drops are measured so that the change in elevation head component of the pressure drops differ between the first pressure drop and the second pressure drop.

The invention may be used to determine any characteristics of the fluid, including mass flow rate, volumetric flow rate, density and viscosity. The manner in which the geometries of the conduit at the first and second locations differs will depend upon the characteristics of the fluid that are sought to be determined.

If one of the characteristics of the fluid that is sought to be determined is the density of the fluid then the orientation of the flow relative to gravity should be varied between the first location and the second location because change in elevation head is a function of the density of the fluid. In this manner, varying the change in elevation head component of the pressure drops causes density to become a variable that must be solved in order to characterize the fluid.

If density of the fluid is not one of the characteristics that is sought to be determined then it is not necessary to vary the orientation of the flow relative to gravity. Instead, the geometries of the first location and the second location may be varied by varying either or both of their actual or effective cross-sectional areas.

If two characteristics of the fluid other than density are sought to be determined, a change in elevation head component in both the first pressure drop and the second pressure drop should be avoided since the values for the two sought characteristics will otherwise require adjustment to account for the change in elevation head component of one or both of the pressure drop measurements. Instead, in such cases the geometries of the first location and the second location should be varied by varying either or both of their actual or effective cross-sectional areas and the first location and the second location should both be horizontally disposed so that there is no change in elevation head component in either the first or second pressure drops.

The present invention may be used to determine the density of the fluid and one other characteristic such as flow rate or viscosity. Alternatively, the invention may be used to determine two characteristics of the fluid other than density, such as for example a flow rate (either mass flow rate or volumetric flow rate) and viscosity. Since mass flow rate is a function of density and volumetric flow rate, the two characteristics sought should not be both mass flow rate and volumetric flow rate since the determination of both of these two characteristics will require either directly or indirectly a determination of the density of the fluid.

For relatively low viscosity fluids, viscosity can be assumed to have a lesser effect on the flow of the fluid, but such fluids are quite susceptible to gravitational segregation unless they are flowing vertically. On the other hand, for relatively viscous fluids, such as some foamy fluids and some oily emulsions, viscosity has a greater effect on the flow of the fluid, but such fluids are not as susceptible to gravitational segregation.

As a result, the invention may be used for the characterization of both relatively viscous and relatively low viscosity fluids. As a rough guideline in this specification, relatively viscous fluids are considered to be fluids having a viscosity of greater than about 500 centipoise while relatively low viscosity fluids are considered to be fluids having a viscosity of less than about 500 centipoise.

The 500 centipoise value is not an absolute value, however, and the higher the viscosity of the fluid, the less the tendency of the fluid toward gravitational segregation and the lower the viscosity of the fluid, the less the effects of viscosity on the flow of the fluid.

Consequently, some fluids having a viscosity of higher than 500 centipoise may be prone to gravitational segregation and some fluids having a viscosity of lower than 500 centipoise may not be prone to gravitational segregation. In addition, the threshold value for viscosity below which the effects of viscosity on the flow of the fluid are small enough to be relatively unimportant will depend upon many factors, including the desired accuracy of the method of the invention.

As a result, since the first pressure drop and the second pressure drop can be used to determine only two characteristics of the fluid, preferably the flow of the fluid at the first location and the second location yields only two variables that must be determined, with any other potential variables either being kept substantially constant or having a substantially negligible net effect on the flow of the fluid.

The invention is, however, best suited for use either with relatively low viscosity fluids where density is one of the characteristics sought to be determined and the first and second locations can be oriented substantially vertically so that the effects of gravitational segregation on the fluid are substantially negligible, or with relatively viscous fluids where viscosity is one of the characteristics sought to be determined and the first and second locations can be oriented substantially horizontally so that the elevation effects of density on the measurement of the flow of the fluid may be considered to be negligible.

Where density of the fluid is one of the characteristics sought to be determined and the first location and the second location are oriented substantially vertically, the flow of fluid at the first location and the second location respectively should be in opposite directions so that the change in elevation head component at the first and second locations is different.

Where density of the fluid is one of the characteristics sought to be determined and the first location and the second location are not both oriented substantially vertically, the change in elevation head components of the first pressure drop and the second pressure drop should be different so that the density of the fluid is a variable that must be determined in order to characterize the fluid.

Where density of the fluid is not one of the characteristics sought to be determined, the change in elevation head components of the first pressure drop and the second pressure drop should preferably both either be negligible or the same so that density of the fluid is not a variable that must be determined in order to characterize the fluid. Preferably, both the first location and the second location are oriented horizontally so that there is no change in elevation head component included in both the first pressure drop and the second pressure drop. In such cases, the geometries of the first location and the second location are preferably varied by varying the cross-sectional area of the first location and the second location. Most preferably, the cross-sectional area of the first location is greater than the cross-sectional area of the second location.

As described above, the invention is comprised of measuring and using the first pressure drop and the second pressure drop to determine two characteristics of the fluid. The invention may, however, also be used to determine more than two characteristics of the fluid by measuring and using more than two pressure drops.

In a method aspect of the invention the conduit may therefore be further comprised of a third section in series with the first section and the second section, wherein the third section has a first end and a second end, wherein the method further comprises the steps of:

(a) third mixing the fluid continuously as it flows from the first end to the second end of the third section of the conduit such that the fluid is substantially homogeneous at a first point in the third section and such that the substantial homogeneity of the fluid is maintained between the first point and a second point in the third section, wherein the first point and the second point are located between the first end and the second end of the third section;

(b) measuring a third pressure drop at a third location in the third section of the conduit between the first point and the second point of the third section, wherein the third location has a geometry different from the geometry of both the first location and the second location; and (c) using the third pressure drop to determine a value for a third characteristic of the fluid.

In an apparatus aspect of the invention, the apparatus may therefore be further comprised of:

(a) the conduit comprising a third section in series with the first and second sections, wherein the third section has a first end and a second end for flowing the fluid through the third section from the first end to the second end, and wherein the third section has a first point and a second point located between the first end and the second end;

(b) a third mixer for mixing the fluid continuously as it flows from the first end to the second end of the third section such that the fluid is substantially homogeneous at the first point in the third section and such that the substantial homogeneity of the fluid is maintained between the first point and the second point in the third section;

(c) a third pressure drop measuring device at a third location in the third section between the first point and the second point of the third section, wherein the third location has a geometry different from the geometry of both the first location and the second location.

The fluid may be mixed in any manner during the third mixing step. Preferably the third mixing step is comprised of directing the fluid through a third mixer located in the third section to produce the substantially homogeneous fluid at the first point in the third section and to maintain the substantial homogeneity of the fluid between the first point and the second point in the third section. The third mixer may be comprised of any type of mixer. Preferably the third mixer is comprised of at least one in-line mixer.

Preferably the in-line mixer in the third section is comprised of a static mixer. Preferably the static mixer extends substantially between the first and second ends of the third section.

Any type of static mixer may be used in the third section. Preferably, the static mixer is chosen to minimize the pressure drop through the static mixer in order to minimize energy loss. Preferably the static mixer in the third section is comprised of a packing material for disrupting the flow of the fluid. Although any type of packing material may be used, a preferred packing material in the third section is comprised of a plurality of permeable ellipsoidal bodies.

The third pressure drop measuring step may be conducted in any manner which will provide a third pressure drop which can be measured by a pressure drop measuring device. For example, the pressure drop may be measured through a venturi nozzle, across an orifice plate or by using some other apparatus. Preferably, however, the third pressure drop measuring step involves using a third pressure drop measuring device to measure the pressure drop experienced by the fluid as it passes through the third mixer.

Any type of pressure drop measuring device may be used to measure the third pressure drop. Preferably, however, the third pressure drop measuring device is a differential pressure drop measuring device so that measurement of the absolute pressure of the fluid can be avoided.

The third pressure drop experienced by the fluid is measured at the third location. The third location has a geometry and the geometry of the third location is different from the geometries of both the first and second locations so that more than two characteristics of the fluid can be determined.

The geometry of the third location may differ from the geometries of the first and second locations due to the flow rate of the fluid or due to the orientation of the flow relative to gravity. The flow rate of the fluid may be varied by changing either or both of the actual cross-sectional area of the conduit and the effective cross-sectional area of the conduit.

The measurement of the third pressure drop enables the invention to be used to determine three characteristics of the fluid. Any three characteristics of the fluid may be determined. Preferably, however, the first pressure drop, the second pressure drop and the third pressure drop are used to determine density of the fluid, viscosity of the fluid and either mass flow rate or volumetric flow rate of the fluid. The determination of these three characteristics can then be used to determine the other of the mass flow rate and volumetric flow rate of the fluid due to the relationship between the flow rate of the fluid and its density.

The same considerations which have been discussed with respect to varying the geometry of the first location and the second location apply to varying the geometry of the third location relative to the first and second locations.

Although both relatively viscous and relatively low viscosity fluids may be characterized using the first, second and third pressure drops, the fluid in this embodiment of the invention is preferably a relatively viscous fluid where the effects of gravitational segregation on the flow of the fluid are considered to be negligible but the effects of viscosity on the flow of the fluid are not negligible.

Preferably the change in elevation head component for at least two of the first pressure drop, the second pressure drop and the third pressure drop is different and preferably the cross-sectional area for at least two of the first location, the second location and the third location is different so that density of the fluid and at least two other characteristics of the fluid can be determined. Preferably the other two characteristics of the fluid include viscosity of the fluid and either mass flow rate or volumetric flow rate of the fluid.

Preferably the cross-sectional area of the first location is greater than the cross-sectional area of the second location and the third location. Preferably two of the first location, the second location and the third location are substantially horizontally oriented and preferably one of the first location, the second location and the third location is substantially vertically oriented. Preferably the cross-sectional area of the substantially vertically oriented location is substantially the same as the cross-sectional area of one of the substantially horizontally oriented locations.

Although embodiments of the invention have been described which can be used to determine two or three characteristics of the fluid, it should be noted that the invention could conceivably also be used to determine additional characteristics of the fluid or to increase the accuracy of the determination of the characteristics by increasing the number of pressure drop measurements that are made under varying flow conditions.

BRIEF DESCRIPTION OF DRAWINGS

Embodiments of the invention will now be described with reference to the accompanying drawings, in which:

FIG. 6 is side view of the third section of the preferred embodiment of the apparatus shown in FIG. 1, having a cut-away portion; and FIG. 7 is a cross-section of the third section taken along lines 7—7 of FIG. 6.

BEST MODE OF CARRYING OUT INVENTION

Figure 1:
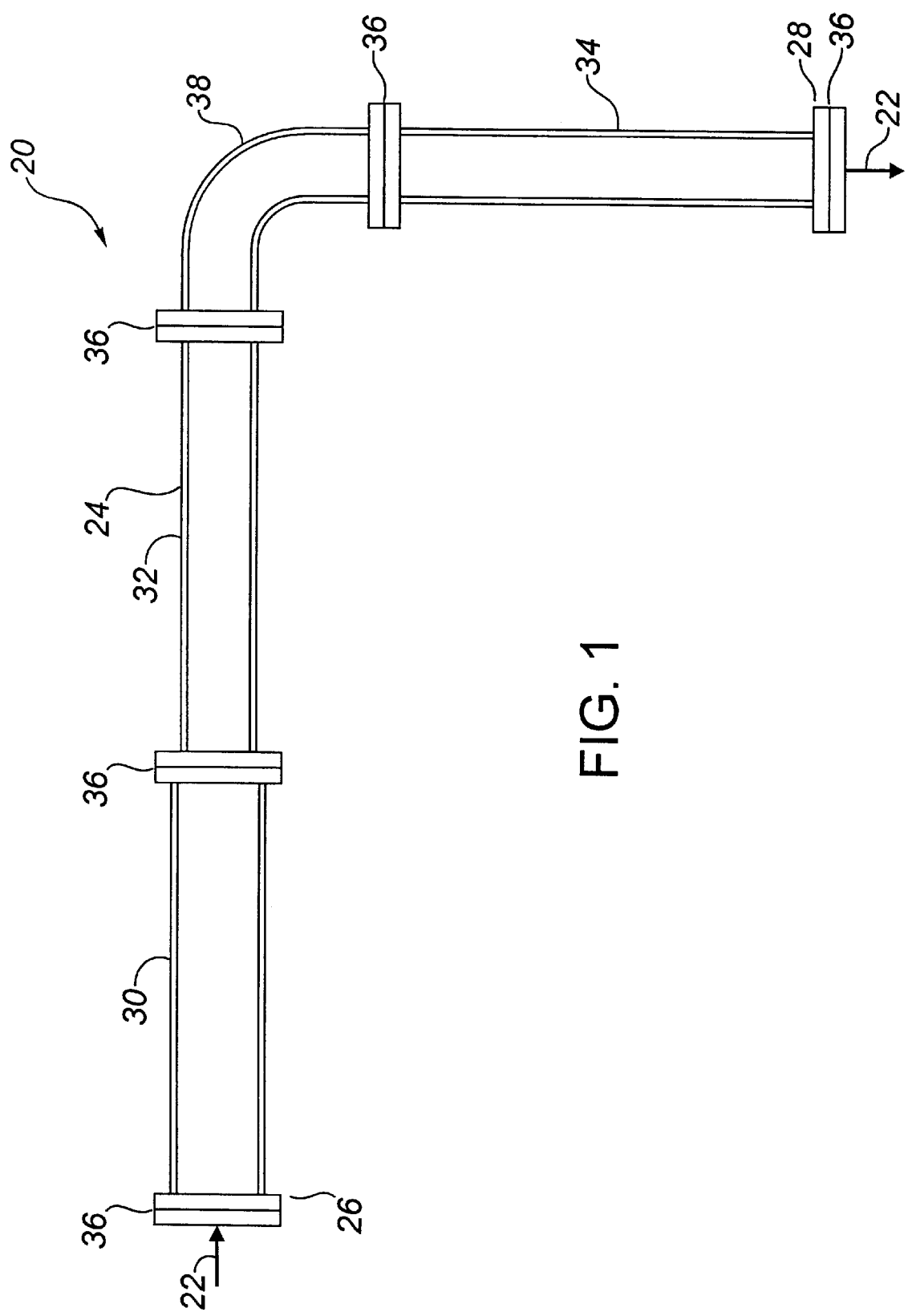
FIG. 1 is a side view of a preferred embodiment of the apparatus of the within invention, having a first section, a second section and a third section.

The within invention is comprised of both a method and an apparatus (20) for characterizing the flow of a multi-phase fluid (22). Preferably, the flow of the multi-phase fluid (22) is characterized by determining a value for at least a first characteristic and a second characteristic of the fluid (22). In the preferred embodiment, the flow of the multiphase fluid (22) is further characterized by determining a value for a third characteristic of the fluid (22).

A value for any three characteristics of the fluid (22) may be determined. However, in the preferred embodiment, the first, second and third characteristics are a flow rate of the fluid (22), either volumetric flow rate or mass flow rate, a viscosity of the fluid (22) and a density of the fluid (22). Where a value is determined for only a first and second characteristic, these two characteristics are preferably the flow rate and the viscosity for a viscous fluid (22) or the flow rate and the density for a low viscosity fluid (22).

A multi-phase fluid (22) is a fluid having more than one phase (liquid or gas), such as a fluid having two or more liquid phases or a combination of a gas phase with one or more liquid phases. The constituent phases of the multi-phase fluid (22) may be separated into distinct layers or inter-mixed in a manner such that there may be separate or discrete slugs or plugs of the various liquid phases or bubbles or slugs of the various gas phases co-mingled together. Preferably, the multi-phase fluid (22) either includes no solid particles or includes an amount or size of solid particles which do not substantially inhibit the flow of the fluid (22) through the apparatus (20).

Further, the fluid (22) may be either a gas continuous medium or a liquid continuous medium. A gas continuous medium is defined as a multi-phase fluid flow medium wherein the continuous fluid phase is a gas into which the other phases (i.e., liquid droplets and solid particles, if present) are dispersed. A liquid continuous medium is defined as a multi-phase fluid flow medium wherein the continuous fluid phase is a liquid into which the other phases (i.e., gas bubbles and solid particles, if present) are dispersed. The dispersed or distributed phase is also termed as the discontinuous phase. A gas continuous medium generally exhibits a lower viscosity than does a liquid continuous medium, with the result that gas continuous media tend to be relatively low viscosity fluids while liquid continuous media tend to be relatively viscous fluids.

In the preferred embodiment, the composition of the fluid (22) is either a gas continuous or a liquid continuous medium. Further, the flow of the fluid (22) may be an annular dispersed flow such that either a liquid film annulus or a gas film annulus may be present depending upon whether the fluid (22) is a gas continuous medium or a liquid continuous medium respectively.

In addition, the within method and apparatus (20) may be used for characterizing the flow of a multiphase fluid (22) having any viscosity, measured in centipoise. However, the specific configuration of the apparatus (20) and the characteristics being determined vary, as described herein, depending upon whether the fluid (22) is considered to be low viscosity or viscous. A low viscosity fluid is a fluid which will readily or easily segregate into the individual constituent fluid phases or which is relatively susceptible to gravitational segregation. A viscous fluid is a fluid which will not readily or easily segregate into its individual constituent fluid phases or which is not relatively susceptible to gravitational segregation. As a rough guideline, low viscosity fluids are fluids having a viscosity of less than about 500 centipoise, while viscous fluids are fluids having a viscosity of greater than about 500 centipoise. In the preferred embodiment, the method and the apparatus (20) are used for characterizing the flow of a viscous fluid (22).

Referring to FIG. 1, the apparatus (20) is comprised of a conduit (24), having a first end (26) and a second end (28), for flowing the fluid (22) therethrough from the first to the second ends (26, 28). Further, the conduit (24) is comprised of at least a first section (30) and a second section (32) connected in series such that the fluid (22) may flow therethrough in sequence. Where the conduit (24) includes first and second sections (30, 32), a value is determinable for a first and a second characteristic, as discussed further below. In the preferred embodiment, the conduit (24) is also comprised of a third section (34) connected in series with the first and second sections (30, 32) such that the fluid (2) flows through each of the first, second and third sections (30, 32, 34) in sequence. In this case, a value is further determinable for a third characteristic of the fluid (22). However, the conduit (24) may include any number of sections in series depending upon the number of characteristics of the fluid (22) which are desired to be determined.

As indicated, a value is determined or is determinable for at least two, and preferably three, characteristics of the fluid (22) as it flows through the conduit (24). More particularly, depending upon the specific geometry of the conduit (24) and the viscosity of the fluid (22), when the conduit (24) is comprised of first and second sections (30, 32), the first characteristic is preferably one of a flow rate, either volumetric or mass flow rate, of the fluid (22) and a density of the fluid (22). The second characteristic may be the other of the flow rate and the density of the fluid (22). However, preferably, when the conduit (24) is comprised of first and second sections (30, 32), the first characteristic is one of the flow rate, either volumetric or mass flow rate, of the fluid (22) and a viscosity of the fluid (22). The second characteristic is the other of the flow rate and the viscosity of the fluid (22). Alternately, any two characteristics of the fluid (22) may be determined.

In the preferred embodiment, in which the conduit (24) is comprised of first, second and third sections (30, 32, 34). The first characteristic is one of the flow rate, either volumetric or mass flow rate, of the fluid (22), the viscosity of the fluid (22) and the density of the fluid (22). The second characteristic is another of the flow rate of the fluid (22), the viscosity of the fluid (22) and the density of the fluid (22). The third characteristic is the last of the flow rate of the fluid (22), the viscosity of the fluid (22) and the density of the fluid (22).

The conduit (24), and each of the sections (30, 32, 34) may be comprised of any erosion and corrosion-resistant material capable of withstanding the pressure of the fluid (22) within the conduit (24) and which will not interfere with the characterization of the fluid flow by the apparatus (20). In the preferred embodiment, the conduit (24) and each of the sections (30, 32, 34) is comprised of a steel pipe. However, the specific material requirements of the conduit (24) will vary depending upon the characteristics and nature of the fluid (22) flowing therethrough.

The conduit (24) may be connected into the flow of the fluid (22) by any suitable means. However, in the preferred embodiment, a connector flange (36) is located at each of the first and second ends (26, 28) of the conduit (24). Depending upon the specific connector flange (36) being used, the diameter of the conduit (24) may decrease or increase slightly at or near either or both of the first and second ends (26, 28) in order that the conduit (24) may be more easily connected into the fluid (22) flow. Preferably, the reduction or enlargement in the diameter occurs gradually in order to decrease the effect of the changed diameter on the flow of the fluid (22).

In addition, the first, second and third sections (30, 32, 34) may be connected together in series by any suitable means. However, again, in the preferred embodiment, one or more connector flanges (36) are located between each of the adjacent sections (30, 32, 34) of the conduit (24). In addition, the sections (30, 32, 34) may be directly or indirectly connected together in series. For instance, referring to FIG. 1, the first section (30) and the second section (32) are directly connected together by the connector flanges (36). The second section (32) and the third section (34) are indirectly connected together in that the sections (32, 34) are separated by at least one connector section (38). Specifically, the connector section (38) is connected in series into the conduit (24) between the desired sections (32, 34) by one or more connector flanges (36).

Depending upon the specific connector flange (36) and the specific connector section (38) being used, the diameter of the conduit (24) may decrease or increase slightly at or near the point of connection of the sections (30, 32, 34). Preferably, the reduction or enlargement in the diameter occurs gradually in order to decrease the effect of the changed diameter on the flow of the fluid (22). Preferably, the length of the connector section (38) is minimized in order to minimize the segregation of the fluid (22) as it flows through the elbow portion of the connector section (38).

Figure 2:
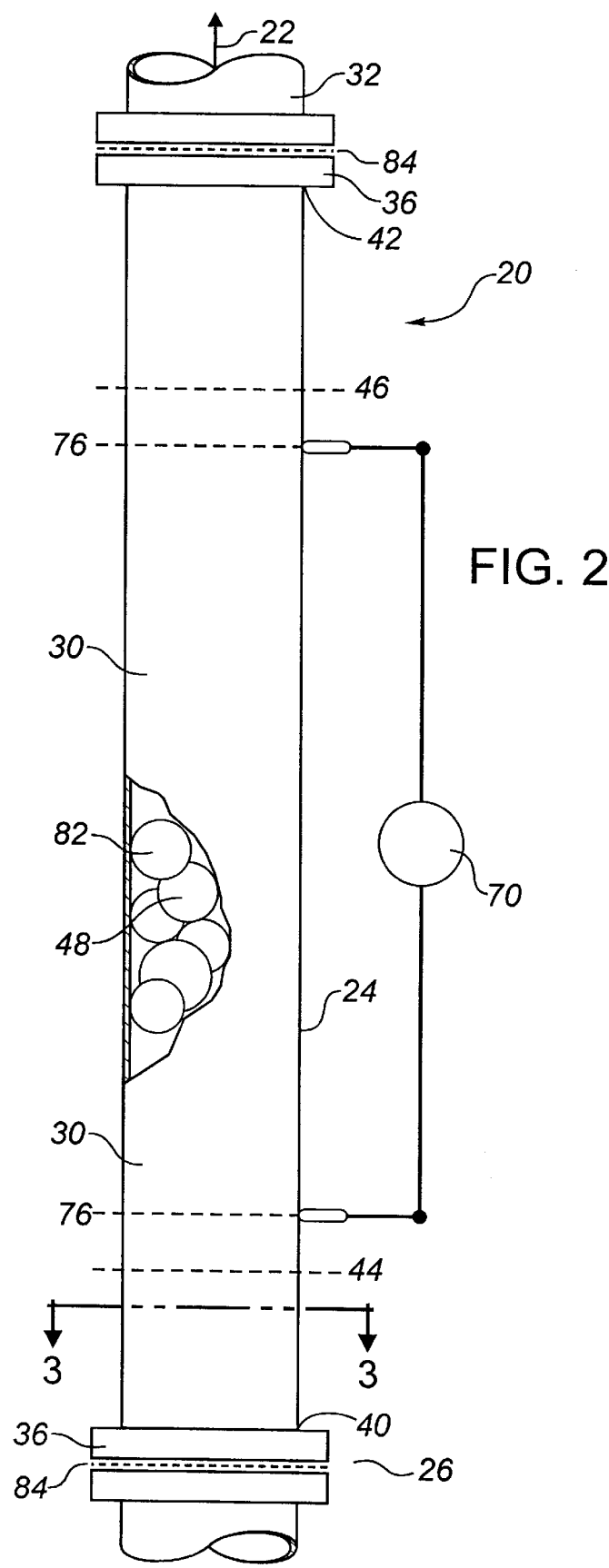
FIG. 2 is side view of the first section of the preferred embodiment of the apparatus shown in FIG. 1, having a cut-away portion.
Figure 3:
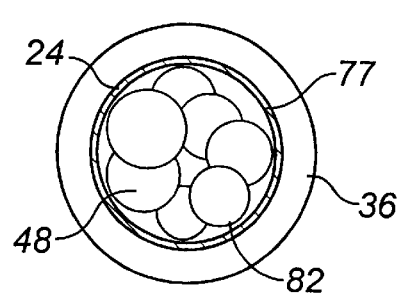
FIG. 3 is a cross-section of the first section taken along lines 3—3 of FIG. 2.

Referring to FIGS. 1, 2 and 3, the first section (30) of the conduit (24) has a first end (40) and a second end (42), for flowing the fluid (22) therethrough from the first to the second ends (40, 42), and a first point (44) and a second point (46) located between the first and second ends (40, 42). In the preferred embodiment, the first end (40) of the first section (30) defines the first end (26) of the conduit (24) comprising the apparatus (20). In addition, the apparatus (20) is further comprised of a first mixer (48) for mixing the fluid (22) continuously as it flows from the first to the second ends (40, 42) of the first section (30) such that the fluid (22) is substantially homogeneous at the first point (44) and such that the substantial homogeneity of the fluid (22) is maintained between the first and second points (44, 46). The first point (44) is located nearer the first end (40) than the second point (46), while the second point (46) is located nearer the second end (42) than the first point (44). Further, the longitudinal axis of the first section (30) extending between the first and second ends (40, 42) is preferably straight, without any bends, angles or curves.

Figure 4:
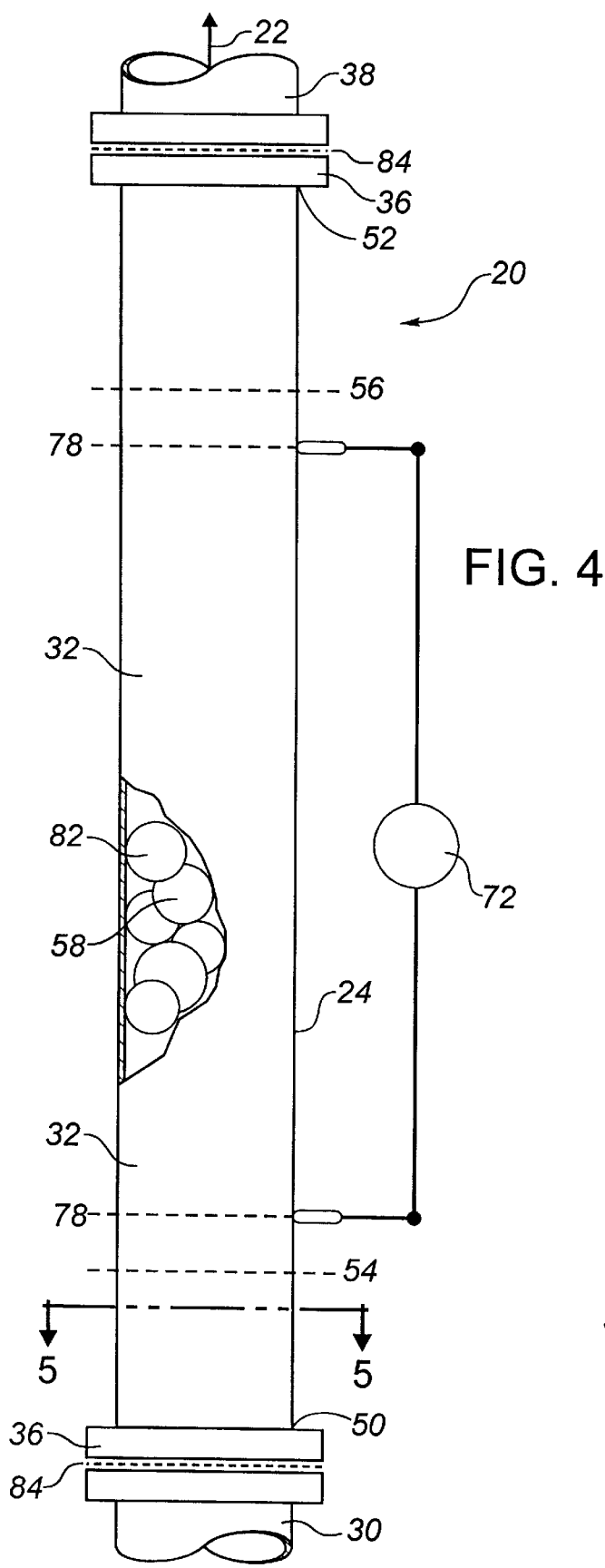
FIG. 4 is side view of the second section of the preferred embodiment of the apparatus shown in FIG. 1, having a cut-away portion.
Figure 5:
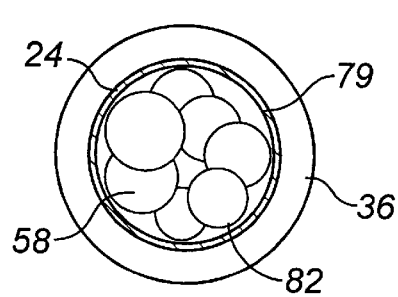
FIG. 5 is a cross-section of the second section taken along lines 5—5 of FIG. 4.

Referring to FIGS. 1, 4 and 5, the second section (32) of the conduit (24) also has a first end (50) and a second end (52), for flowing the fluid (22) therethrough from the first to the second ends (50, 52), and a first point (54) and a second point (56) located between the first and second ends (50, 52). In addition, the apparatus (20) is further comprised of a second mixer (58) for mixing the fluid (22) continuously as it flows from the first to the second ends (50, 52) of the second section (32) such that the fluid (22) is substantially homogeneous at the first point (54) and such that the substantial homogeneity of the fluid (22) is maintained between the first and second points (54, 56). The first point (54) is located nearer the first end (50) than the second point (56), while the second point (56) is located nearer the second end (52) than the first point (54). Further, the longitudinal axis of the second section (32) extending between the first and second ends (50, 52) is preferably straight, without any bends, angles or curves.

Finally in the preferred embodiment, including the third section (34), referring to FIGS. 1, 6 and 7, the third section (34) of the conduit (24) has a first end (60) and a second end (62), for flowing the fluid (22) therethrough from the first to the second ends (60, 62), and a first point (64) and a second point (66) located between the first and second ends (60, 62). In the preferred embodiment, the second end (62) of the third section (34) defines the second end (28) of the conduit (24) comprising the apparatus (20). In addition, the apparatus (20) is further comprised of a third mixer (68) for mixing the fluid (22) continuously as it flows from the first to the second ends (60, 62) of the third section (34) such that the fluid (22) is substantially homogeneous at the first point (64) and such that the substantial homogeneity of the fluid (22) is maintained between the first and second points (64, 66). The first point (64) is located nearer the first end (60) than the second point (66), while the second point (66) is located nearer the second end (62) than the first point (64). Further, the longitudinal axis of the third section (34) extending between the first and second ends (60, 62) is preferably straight, without any bends, angles or curves.

The first ends (40, 50, 60) of each of the sections (30, 32, 34) is defined by the point at which the mixing of the fluid (22) commences in that section (30, 32, 34). Due to a mixing entrance effect, when the mixing of the fluid (22) commences, the fluid (22) is not immediately substantially homogeneous. Rather, the fluid (22) must undergo a period of mixing in order to achieve a substantially homogeneous state. As a result, the first ends (40, 50, 60) of each of the sections (30, 32, 34, at which the mixing commences, must be located a sufficient distance upstream of the respective first points (44, 54, 64) of each of the sections (30, 32, 34) to take into account the mixing entrance effect and to allow the mixing to act on the fluid flow and thereby produce the substantially homogeneous fluid at the first points (44, 54, 64).

The second ends (42, 52, 62) of each of the sections (30, 32, 34) is defined by the point at which the mixing of the fluid (22) is able to cease and yet still produce the substantially homogeneous fluid between the respective first points (44, 54, 64) and second points (46, 56, 66). Due to a mixing exit effect, the substantial homogeneity of the fluid (22) may not be maintained for a distance upstream of the point at which the mixing actually ceases. As a result, the second ends (42, 52, 62) of each of the sections (30, 32, 34), at which the mixing of the fluid (22) ceases, must be located a sufficient distance downstream from the respective second points (46, 56, 66) to take into account the mixing exit effect and thereby maintain the substantial homogeneity of the fluid (22) between the respective first points (44, 54, 64) and second points (46, 56, 66).

Each section (30, 32, 34) is defined by the distance between its respective first end (40, 50, 60) and second end (42, 52, 62). The minimum length of each section (30, 32, 34) is governed by the need to provide the fluid (22) with sufficient residence time within the particular section (30, 32, 34) to permit mixing of the fluid (22) such that it is substantially homogeneous at the first point (44, 54, 64) of each section (30,32,34) and between the first point (44,54, 64) and second point (46, 56, 66) of each section (30, 32, 34) and to permit characterization of the substantially homogeneous fluid by the characterizing means described below.

The maximum length of each section (30, 32, 34) is governed primarily by the maximum permissible pressure drop between the first end (40, 50, 60) and the second end (42, 52, 62) of each section (30, 32, 34). The minimum length of each section (30, 32, 34) is governed primarily by the minimum pressure drop required between the first end (40, 50, 60) and the second end (42, 52, 62) of each section (30, 32, 34) in order to facilitate measurement.

Each section (30, 32, 34) is preferably cylindrical in cross-section and its diameter must be selected to permit the flow of the fluid (22) through the section (30, 32, 34) without causing significant backup in the flow or excessive pressure drop and to provide sufficient space within the section (30, 32, 34) for containing other elements of the apparatus (20), as described below. As a result, both the diameter and the length of each section (30, 32, 34) are dependent upon the flow rate of the fluid (22) through that section (30, 32, 34), upon the composition and other characteristics of the fluid (22) and upon the characteristics of the fluid (22) desired to be determined, as discussed below.

Generally, the overall design of the preferred embodiment of the apparatus (20), including each constituent element such as each section (30, 32, 34) of the conduit (24), are dependent upon the composition and other characteristics of the fluid (22), the fluid flow rate, the desired pressure drop of the fluid (22) in the apparatus (20) and the characteristics of the fluid (22) desired to be determined, as discussed further below. Specifically, based upon these variables, the preferred embodiment, and the parameters and specifications of its elements, are designed in order to achieve the desired results, as described below.

As stated, each of the first, second and third mixers (48, 58, 68) mixes the fluid (22) in each of the first, second and third sections (30, 32, 34) respectively such that the fluid (22) is substantially homogeneous over the cross-section of the section (30, 32, 34) at the first point (44, 54, 64) and such that the substantial homogeneity of the fluid (22) is maintained over the cross-section of the section (30, 32, 34) between the first point (44, 54, 64) and the second point (46, 56, 66) in the section (30, 32, 34). The homogeneity is maintained by each of the first, second and third mixers (48, 58, 68) continuously mixing the fluid (22) as it flows from the first end (40, 50, 60) to the second end (42, 52, 62) of each respective section (30, 32, 34). The fluid (22) is considered to be substantially homogeneous when the mixing variation coefficient (omega/x*) of the fluid is 0.05 or less, where "omega" is the standard deviation of the concentration "x" (concentration distribution over the section being considered) of one phase in the fluid (22) and "*" is the mean concentration.

As well, the apparatus (20) is further comprised of a first pressure drop measuring device (70) located in the first section (30) for measuring a first pressure drop and a second pressure drop measuring device (72) located in the second section (32) for measuring a second pressure drop. The first pressure drop and the second pressure drop are used to determine a value for the first characteristic of the fluid (22) and to determine a value for the second characteristic of the fluid (22).

As discussed herein, when the conduit (24) is comprised of the first and section sections (30, 32), depending upon the specific geometry of the conduit (24) and the viscosity of the fluid (22), the first characteristic of the fluid (22) may be one of a flow rate, either volumetric or mass flow rate, of the fluid (22) and a density of the fluid (22), while the second characteristic may be the other of the flow rate and the density of the fluid (22). However, preferably, the first characteristic is one of the flow rate, either volumetric or mass flow rate, of the fluid (22) and a viscosity of the fluid (22), while the second characteristic is the other of the flow rate and the viscosity of the fluid (22).

Further, in the preferred embodiment, the apparatus (20) is further comprised of a third pressure drop measuring device (74) located in the third section (34) for measuring a third pressure drop. The third pressure drop is used to determine a value for the third characteristic of the fluid (22).

As discussed herein, when the conduit (24) is comprised of the first, second and third sections (30, 32, 34), depending upon the specific geometry of the conduit (24) and the viscosity of the fluid (22), the first characteristic of the fluid (22) is one of a flow rate, either volumetric or mass flow rate, of the fluid (22), a viscosity of the fluid (22) and a density of the fluid (22). The second characteristic is another of the flow rate of the fluid (22), the viscosity of the fluid (22) and the density of the fluid (22). The third characteristic is the last of the flow rate of the fluid (22), the viscosity of the fluid (22) and the density of the fluid (22).

The first pressure drop measuring device (70) is located at a first location (76) in the first section (30) of the conduit (24), the first location (76) having a first cross-sectional area (77) and having a geometry, as discussed below. The first location (76) is located between the first and second points (44, 46) of the first section (30). Thus, the first section (30) provides for the simultaneous or concurrent mixing and characterizing of the fluid (22).

Further, the second pressure drop measuring device (72) is located at a second location (78) in the second section (32) of the conduit (24), the second location (78) having a second cross-sectional area (79) and having a geometry different from the geometry of the first location (76), as discussed below. The second location (78) is located between the first and second points (54, 56) of the second section (32). Thus, the second section (32) also provides for the simultaneous or concurrent mixing and characterizing of the fluid (22).

Finally, the third pressure drop measuring device (74) is located at a third location (80) in the third section (34) of the conduit (24), the third location (80) having a third cross-sectional area and having a geometry different from the geometry of both the first location (76) and the second location (78), as discussed below. The third location (80) is located between the first and second points (64, 66) of the third section (34). Thus, the third section (34) similarly provides for the simultaneous or concurrent mixing and characterizing of the fluid (22).

The cross-sectional areas (77, 79, 81) referred to above may be defined by the actual cross-sectional areas or the effective cross-sectional areas at each of the locations (76, 78, 80). The actual cross-sectional area is dependent upon the diameter or circumference of the section (30, 32, 34) at the location (76, 78, 80), and in particular, the diameter or circumference of the pipe comprising the section (30, 32, 34). The effective cross-sectional area is dependent upon the diameter or circumference of the section (30, 32, 34) at the location (76, 78, 80), as well as the flow path of the fluid (22) through the location (76, 78, 80), which may be altered by the type or properties of mixer (48, 58, 68) mixing the fluid (22) at the locations (76, 78, 80). The minimum length of each location (76, 78, 80) is governed primarily by the minimum pressure drop required at the locations (76, 78, 80) in order to facilitate measurement.

Thus, the first, second and third characteristics of the fluid (22) are each determined at locations (76, 78, 80) in the conduit (24) at which the first, second and third mixers (48, 58, 68) cause and maintain the substantially homogeneity of the fluid (22).

As indicated, the second location (78) has a geometry different from the geometry of the first location (76). In addition, the third location (80) has a geometry different from the geometry of both the first location (76) and the second location (78). The geometries may differ due to the flow rate of the fluid (22) or due to the orientation of the flow relative to gravity. More particularly, the flow rate may be varied by varying the cross-sectional areas (77, 79, 81), either actual or effective, of the locations (76, 78, 80). The orientation of the flow relative to gravity may be varied by varying the relative elevations of the first points (44, 54, 64) and second points (46, 56, 66) between which the pressure drops are measured so that the change in elevation head component of the pressure drops differ between the pressure drops. The purpose of providing a different geometry is to create different flow conditions for the fluid (22) in each of the sections (30, 32, 34) such that the first, second and third characteristics of the fluid (22) are determinable.

For instance, when the conduit (24) comprises the first and second sections (30, 32), each of the first location (76) and the second location (78) may have a different orientation relative to gravity. More particularly, the change in the elevation head component of the first pressure drop at the first location (76) is different from the change in the elevation head component of the second pressure drop at the second location (78).

This configuration of the sections (30, 32) is preferably used when one of the characteristics sought to be determined is the density of the fluid (22). Preferably, the first characteristic of the fluid (22) to be determined is one of the flow rate, volumetric or mass, of the fluid (22) and the density of the fluid (22), while the second characteristic of the fluid (22) to be determined is the other of the flow rate of the fluid (22) and the density of the fluid (22). In this case, the fluid (22) is preferably low viscosity so that the effects of the viscosity of the fluid (22) upon the flow characteristics of the fluid can be considered to be negligible in the determination of the values of the first characteristic and the second characteristic.

However, although the viscosity can be assumed to have a negligible effect on the flow of the fluid (22), low viscosity fluids are susceptible to gravitational segregation unless they are flowing vertically. For this reason, the sections (30, 32) are preferably oriented substantially vertically so that the effects of gravitational segregation can be considered to be negligible. In this instance, the flow of the fluid (22) at the first location (76) and the second location (78) should be in opposite directions so that the change in elevation head component at the first and second locations (76, 78) is different. Alternately, if not oriented substantially vertically, the change in elevation head components of the first pressure drop and the second pressure drop should be different.

However preferably, when the conduit (24) comprises the first and section sections (30, 32), each of the first location (76) and the second location (78) have different geometries by varying the cross-sectional areas (77, 79). This configuration of the sections (30, 32) is preferably used when one of the characteristics sought to be determined is not the density of the fluid (22). Specifically, the first characteristic of the fluid (22) to be determined is one of the flow rate, volumetric or mass, of the fluid (22) and the viscosity of the fluid (22), while the second characteristic of the fluid (22) to be determined is the other of the flow rate of the fluid (22) and the viscosity of the fluid (22). As well, in this case, the fluid (22) is preferably viscous so that the effects of the gravitational segregation of the fluid (22) in the conduit (24), and particularly in each of the sections (30, 32), can be considered to be negligible in the determination of the values of the first characteristic and the second characteristic.

In this case, it is not necessary to vary the orientation of the flow relative to gravity. Rather, a change in the elevation head component in both the first pressure drop at the first location (76) and the second pressure drop at the second location (78) should be avoided so that the change need not be adjusted for in determining the values for he first and second characteristics. Specifically, the first and second sections (30, 32) are preferably oriented substantially horizontally. As a result, since neither of the first pressure drop nor the second pressure drop includes an elevation head component, the effects of the density of the fluid (22) upon the flow characteristics of the fluid (22) can be considered to be negligible in the determination of the values of the first characteristic and the second characteristic.

In the preferred embodiment, in which the conduit (24) comprises the first, second and third sections (30, 32, 34), the geometry of the third location (80) differs from the geometries of the first and second locations (76, 78). The geometries may differ due to the flow rate of the fluid (22) or due to the orientation of the flow relative to gravity. The same considerations as discussed above for two sections (30, 32) are equally applicable to three sections (30, 32, 34). Thus, the flow rate of the fluid (22) may be varied by varying either or both of the cross-sectional area of the sections (30, 32, 34) or the elevation head component of the first, second and third pressure drops.

In the preferred embodiment, in which the fluid (22) is relatively viscous, the orientation relative to gravity of at least two of the first location (76), the second location (78) and the third location (80) is different. In other words, the change in elevation head component of the pressure drop for at least two of the first location (76), second location (78) and third location (80) is different. In addition, the cross-sectional area (77, 79, 81) of at least two of the first location (76), the second location (78) and the third location (80) is different.

Preferably, the first cross-sectional area (77) of the first location (76) is greater than the second cross-sectional area (79) of the second location (78). In addition, preferably, the first cross-sectional area (77) of the first location (76) is greater than the third cross-sectional area (81) of the third location (80).

Further, preferably, two of the first location (76), the second location (78) and the third location (80) are substantially horizontally oriented. As well, preferably, one of the first location (76), the second location (78) and the third location (80) is substantially vertically oriented. Finally, the cross-sectional area of the vertically oriented section is the same as the cross-sectional area of one of the horizontally oriented sections.

Referring to FIG. 1, in the preferred embodiment, the first and second locations (76, 78) are substantially horizontally oriented, while the third location (80) is substantially vertically oriented. In addition, the first cross-sectional area (77) of the first location (76) is greater than both the second cross-sectional area (79) of the second location (78) and the third cross-sectional area (81) of the third location (80). Finally, the second cross-sectional area (79) of the second location (78) is substantially similar to the third cross-sectional area (81) of the third location (80).

If the fluid (22) is a liquid continuous medium, the first point (64) in the third section (34) is preferably below the second point (66) in the third section (34) so that the fluid (22) flows upwards in the third section (34), and thus follows the tendency of the gas phase or phases to rise. If the fluid (22) is a gas continuous medium, the first point (64) is preferably above the second point (66) in the third section (34) so that the fluid (22) flows downwards in the third section (34), and thus follows the tendency of the liquid phase or phases to fall.

Finally, as indicated, in the preferred embodiment having the geometries of the first, second and third locations (76, 78, 80) described above, the fluid (22) is preferably viscous so that the effects of gravitational segregation of the fluid (22) in the conduit (24), and particularly in each of the sections (30, 32, 34), can be considered to be negligible in the determination of the values of the first characteristic, the second characteristic and the third characteristic.

Each of the first, second and third mixers (48, 58, 68) may be comprised of any known type of mixing device, or a combination of one or more such devices, capable of producing and maintaining the substantially homogeneous fluid (22) between the first point (44, 54, 64) and the second point (46, 56, 66) of each section (30, 32, 34). Therefore, each mixer (48, 58, 68) must be compatible with the specific nature and properties of the fluid (22) being mixed. Preferably, each mixer (48, 58, 68) is comprised of at least one in-line mixer located within, or substantially within, its respective section (30, 32, 34) in a manner and at a location within the section (30, 32, 34) to produce the substantially homogeneous fluid at the first point (44, 54, 64) and between the first point (44, 54, 64) and the second point (46, 56, 66) of each section (30, 32,34).

Further, the in-line mixer (48, 58, 68) in at least one of the sections (30, 32, 34) is preferably comprised of a static mixer. More preferably, each of the mixers (48, 58, 68) is comprised of a static mixer. A static mixer is preferred due to the relative simplicity, energy efficiency and cost effectiveness of static mixers as compared to other mixers.

In the preferred embodiment, each static mixer (48, 58, 68) extends substantially between the first end (40, 50, 60) and the second end (42, 52, 62) of the length of the section (30, 32, 34). As a result, each static mixer (48, 58, 68) mixes the fluid (22) continuously from the first end (40, 50, 60) to the second end (42, 52, 62). Each mixer (48, 58, 68) thereby achieves substantial homogeneity of the fluid (22) at the first point (44, 54, 64) and maintains substantial homogeneity of the fluid (22) as it flows from the first point (44, 54, 64) to the second point (46, 56, 66), and thus, at the first, second and third locations (76, 78, 80).

Although not preferred, a gap in each mixer (48, 58, 68), being an area between the first end (40, 50, 60) and the second end (42, 52, 62) not containing the mixer (48, 58, 68), is permissible as long as the mixing effect from the mixer (48, 58, 68) maintains the substantial homogeneity of the fluid (22) in the gap. In essence, the mixer (48, 58, 68) downstream from the gap produces an upstream mixing effect, while the mixer (48, 58, 68) upstream from the gap produces a downstream mixing effect. The upstream and downstream mixing effects act together to produce a continuous mixing action of the fluid (22) within the gap. Thus, the permissible size of the gap will depend upon the extent of the mixing effects produced by the mixer (48, 58, 68) on either side of the gap.

Further, the static mixer (48, 58, 68) in at least one section (30, 32, 34) and preferably each static mixer (48, 58, 68), is preferably comprised of the section (30, 32, 34) containing a packing material which extends from the first end (40, 50, 60) to the second end (42, 52, 62) of the section (30, 32, 34). The packing material allows the fluid (22) to flow therethrough, while creating a tortuous flow path which disrupts the flow of the fluid (22) sufficiently to mix the fluid (22) to a substantially homogeneous state. A mixer (48, 58, 68) comprised of the packing material is preferred because the packing material, and thus the mixer (48, 58, 68), are relatively compact, simple in their structure, and easy and inexpensive to use, maintain and replace, as needed, as compared to other known mixers.

Any packing material may be used which is capable of mixing the fluid (22) in a manner to achieve substantial homogeneity at a wide range of flow rates. Further, the packing material should be chosen so that it is compatible with the fluid (22) and so that the mixing effect caused by it does not result in a permanent change in the fluid flow characteristics or an excessive pressure drop of the fluid (22). As well, the packing material is preferably light weight and rugged. Any suitable configuration of the packing material may be used, including broken solids, shaped packings and grids. However, packing materials with low porosity, low crushing strength or high density are not preferred. In selecting the type, configuration and specific dimensions of the packing material to be used, some of the factors to be considered are as follows: the length and overall dimensions of the conduit (24); the amount and size of any solids in the fluid (22), so that any plugging by the solids is minimized, and other fluid characteristics; the acceptable pressure drop as the fluid (22) passes through the packing material; the flow rate of the fluid (22) through the conduit (24); and the ability to pack the material to provide good packing characteristics.

In the preferred embodiment, the packing material is comprised of a plurality of hollow, permeable, ellipsoidal bodies (82). However, although hollow bodies (82) are used in the preferred embodiment, the bodies (82) need not be hollow as long as the packing material has the characteristics noted above. Further, the bodies (82) may have a shape other than an ellipsoid, such as a rhomboid or a cylinder. However, ellipsoidal bodies (82) are preferred as they permit close packing of the bodies (82) within the sections (30, 32, 34) and provide a relatively high void space, low blockage tendency, low pressure drop of the fluid (22) passing therethrough, and high active surface area for mixing the fluid (22). Due to the relatively low pressure drop, the ellipsoidal bodies (82) are particularly suited to a wide range of flow rates and the preferred apparatus (20) may be used where excessive pressure drops are likely to be a concern.

The ellipsoidal bodies (82) may be made of any suitable material which is compatible with the fluid (22). However, the ellipsoidal bodies (82) are preferably made of plastic as plastic is relatively inexpensive, light weight, compatible with most uses of the apparatus (20) and will not tend to interfere with the equipment used to measure and characterize the fluid (22). Suitable plastics include polyethylene, polypropylene and polytetrafluorethylene.

The preferred ellipsoidal bodies (82) used in the apparatus (20) are sold under the registered trade-mark TRI-PACKS® by Jaeger Tri-Packs Inc. and are generally described in U.S. Pat. No. 4,203,935 granted May 20, 1980 to Rolf Jaeger. The TRI-PACKS® packing is comprised of spherical bodies shaped in a lattice-work jacket or network of ribs and struts. Although specifically designed as a filter medium, it has been found that the TRI-PACKS® packing may be used in the within invention to effectively mix the fluid (22). The size of the preferred TRI-PACKS® packing will depend upon the diameter of the sections (30, 32, 34) and the conduit (24). However, generally, TRI-PACKS® packing having a diameter of about 25 mm, being the smallest size commercially available, is preferred as this size appears to be most versatile. TRI-PACKS® packing having a diameter of 25 mm can typically be used in varying sizes of conduit (24) having larger or smaller diameters.

Further, in the preferred embodiment, a screen (84) is located across the conduit (24) adjacent the connector flanges (36) at each of the first ends (40, 50, 60) and second ends (42, 52, 62) of each section (30, 32, 34). The screens (84) are sized to permit the flow of the fluid (22) into and out of each section (30, 32, 34) through the conduit (24) relatively unimpeded while retaining the ellipsoidal bodies (82) within each section (30, 32, 34). Further, the screen (84) at the first ends (40, 50, 60) may also be selected to filter solid particles of a desired size from the fluid (22) and prevent their entry into the section (30, 32, 34).

Although the preferred mixer (48, 58, 68) for each section (30, 32, 34) is described above, as stated, the mixer (48, 58, 68) may be comprised of any known type of mixing device capable of performing the function of the preferred embodiment described herein. Thus, the mixer (48, 58, 68) of each section (30, 32, 34) may be comprised of a rotary mixer, a recirculating jet mixer, other types of static mixer or a variable geometry static mixer. Other types of static mixer include flow diverters, perforated pipes, sieve plates, corrugated plates, helical vanes and the like, which compel the fluid (22) to change direction abruptly and thereby promote turbulence and mixing of the fluid (22). Further, a variable geometry static mixer may be used, if needed, to regulate the disruption of the fluid (22) as the volumetric flow rate of the fluid (22) through each section (30, 32, 34) changes.

As well, the mixer (48, 58, 68) of each section (30, 32, 34) may be comprised of a combination of two or more known types of mixing devices which act together to produce the substantially homogeneous fluid between the first point (44, 54, 64) and the second point (46, 56, 66) in a manner similar to the mixing effect achieved when a gap exists in the mixer (48, 58, 68), as described above. For instance, an initial mixer (not shown) may be located in one or more sections (30, 32, 34) adjacent the first point (44, 54, 64) and a subsequent mixer (not shown) may be located adjacent the second point (46, 56, 66) of that section (30, 32, 34). A first downstream mixing effect of the initial mixer and a second upstream mixing effect of the subsequent mixer together produce the substantially homogeneous fluid between the first point (44, 54, 64) and the second point (46, 56, 66). The first and second mixing effects combine to result in a continuous mixing of the fluid (22) between the first point (44, 54, 64) and the second point (46, 56, 66) in that section (30, 32, 34). Thus, the acceptable distance between the initial and subsequent mixers will be dependent upon the extent of the first and second mixing effects. Preferably, the initial and subsequent mixers abut to ensure that the fluid (22) is mixed continuously as it flows from the first point (44, 54, 64) to the second point (46, 56, 66).

Each of the first pressure drop measuring device (70), second pressure drop measuring device (72) and third pressure drop measuring device (74) of the apparatus (20) may be comprised of any known device, or combination of two or more devices, for measuring a pressure drop which is compatible with, and suitable for, the specific nature and properties of the fluid (22) being measured. Further, the first, second and third pressure drop measuring devices (70, 72, 74) must be capable of measuring the range of the magnitude of the pressure drop anticipated at the first, second and third locations (76, 78, 80) respectively.

Further, as the fluid (22) is substantially homogeneous at the first, second and third locations (76, 78, 80) where the pressure drop is measured, each of the first, second and third pressure drop measuring devices (70, 72, 74) is preferably comprised of any known device, or combination of two or more devices, able to relatively accurately measure the pressure drop of a single phase fluid. However, as a single phase fluid may be comprised of either a liquid phase or a gas phase, the specific device used must again be compatible with, and suitable for, the specific nature and properties of the homogeneous fluid being measured. Again, the first, second and third pressure drop measuring devices (70, 72, 74) must be capable of measuring the range of the magnitude of the pressure drop anticipated at the first, second and third locations (76, 78, 80) respectively.

In the preferred embodiment, the fluid (22) has a flow pattern at the first, second and third locations (76, 78, 80) in the first, second and third sections (30, 32, 34) respectively which causes the first, second and third pressure drops of the fluid (22) at the first, second and third locations (76, 78, 80). The flow pattern causing the pressure drops is preferably created by the mixer (48, 58, 68) in each section (30, 32, 34). Thus, the first mixer (48) causes the first pressure drop at the first location (76) in the first section (30), the second mixer (58) causes the second pressure drop at the second location (78) in the second section (32) and the third mixer (68) causes the third pressure drop at the third location (80) in the third section (34). Further, in the preferred embodiment, the first pressure drop measuring device (70) measures the first pressure drop across or through the first mixer (48) at the first location (76). The second pressure drop measuring device (72) measures the second pressure drop across or through the second mixer (58) at the second location (78). Finally, the third pressure drop measuring device (74) measures the third pressure drop across or through the third mixer (68) at the third location (80).

The first, second and third locations (76, 78, 80) are not a single point or place in the first, second and third sections (30, 32, 34) respectively, but rather, a physical distance or amount of space between two points or places. In the preferred embodiment, the mixer (48, 58, 68) in each section (30, 32, 34) substantially extends from the first end (40, 50, 60) to the second end (42, 52, 62) of each section (30, 32, 34) and therefore extends between the points or places in the section (30, 32, 34) defining the first, second and third locations (76, 78, 80). Thus, each pressure drop measuring device (70, 72, 74) measures the pressure drop across the portion of the mixer (48, 58, 68) located at the first, second or third location (76, 78, 80) or located between the points or places in the section (30, 32, 34) defining the first, second or third location (76, 78, 80). In the preferred embodiment, the magnitude of the anticipated pressure drop at the first, second and third locations (76, 78, 80) will vary depending upon the nature and composition of the multi-phase fluid (22) and the specific mixer (48, 58, 68) being used.

In the preferred embodiment, each of the first, second and third pressure drop measuring devices (70, 72, 74) is comprised of a conventional differential pressure device, located at the first, second and third locations (76, 78, 80) respectively, which measures directly the difference in pressure between the two points defining the first, second or third location (76, 78, 80). Alternatively, a first pressure gauge or tap (not shown) and a second pressure gauge or tap (not shown) at the first, second or third locations (76, 78, 80) could be used in order to make two separate pressure measurements at the first, second or third locations (76, 78, 80) which can then be compared to each other to determine the pressure drop. This embodiment, however, tends to provide a less accurate measurement of pressure drop than does a differential device. However, as indicated, each pressure drop measuring device (70, 72, 74) may be comprised of any other suitable known device for measuring the pressure drop of the fluid flow at the first, second or third locations (76, 78, 80). Further, the type of pressure drop measuring device and the manner of measuring the pressure drop may vary between the first, second and third locations (76, 78, 80). The measured pressure drops are then used to determine a value for the first and second, and preferably the third, characteristics of the fluid (22)

Although the flow pattern of the fluid (22) which causes the pressure drop is preferably created by the mixer (48, 58, 68), it may alternately be created by the pressure drop measuring device (70, 72, 74), which is located at the first, second or third location (76, 78, 80). Thus, the measuring device (70, 72, 74) measures the pressure drop across or through the measuring device (70, 72, 74). In his case, the measuring device (70, 72, 74) may be comprised of an orifice, a venturi, a nozzle or a similar measuring device (not shown) positioned at a gap in the mixer (48, 58, 68) at one or more of the first, second and third locations (76, 78, 80). As indicated above, where a gap exists in the mixer (48, 58, 68), the gap must be small enough to permit the upstream and downstream mixing effects to act together to result in a continuous mixing of the fluid (22) through the gap and thus, through the measuring device (70, 72, 74). These types of measuring devices typically result in large pressure drops and therefore their use may not be desirable in some circumstances depending upon the other operating parameters and conditions of the apparatus (20) and the fluid (22).

Although all of the dimensions of the apparatus (20) should be designed in order to achieve the desired results as set out herein, it has been found that as a general rule of thumb, or starting point for the design of the apparatus (20), the following mathematical relationships to the diameter of the conduit (24) may apply. The minimum length of each section (30, 32, 34) between the first end (40, 50, 60) and the second end (42, 52, 62) may be about thirty times the diameter of the section (30, 32, 34). The distance between the two points or places in each section (30, 32, 34) defining the first, second and third locations (76, 78, 80) may be about twenty to twenty-five times the diameter of the section (30, 32, 34). The distance between the first end (40, 50, 60) of each section (30, 32, 34) and the first, second and third locations (76, 78, 80) respectively (i.e., the upstream point or place defining the start of the first, second and third locations (76, 78, 80)) may be about fifteen times the diameter of the section (30, 32, 34). In the preferred embodiment, the first section (30) has a diameter of about 75 mm, while the second and third sections (32, 34) have a diameter of about 50 mm.

The method of the within invention characterizes the flow of the multi-phase fluid (22) as the fluid (22) flows through the conduit (24), and more particularly, through each of the sections (30, 32, 34) in series comprising the conduit (24). Preferably, the method is conducted or performed using the apparatus (20) described above. As indicated previously, the specifications and parameters of the preferred embodiment of the apparatus (20) are designed to accommodate, and be compatible with, the flow rate of the fluid (22), the composition and other characteristics of the fluid (22) and the desired pressure drop in the apparatus (20). Further, in order to maintain the accuracy of the apparatus (20), the apparatus (20) should be calibrated before use.

In the method, the fluid (22) is characterized as it flows through the conduit (24), from the first ends (40, 50, 60) to the second ends (42, 52, 62) of each of the first, second and third sections (30, 32, 34) in series or sequentially. Thus, the apparatus (20), and specifically the conduit (24), must be connected into a flow of the multi-phase fluid (22), such as a pipeline, so that the fluid (22) flows through the conduit (24) from its first end (26) to its second end (28).

The method for characterizing the fluid (22) flow is comprised of the steps of: (a) first mixing the fluid (22) as it flows from the first end (40) to the second end (42) of the first section (30) such that the fluid (22) is substantially homogeneous at the first point (44) in the first section (30) and such that the substantial homogeneity of the fluid (22) is maintained between the first point (44) and the second point (46) in the first section (30); and (b) measuring the first pressure drop at the first location (76) in the first section (30) between the first point (44) and the second point (46).

Further, the method is comprised of the steps of: (c) second mixing the fluid (22) as it flows from the first end (50) to the second end (52) of the second section (32) such that the fluid (22) is substantially homogeneous at the first point (54) in the second section (32) and such that the substantial homogeneity of the fluid (22) is maintained between the first point (54) and the second point (56) in the second section (32); and (d) measuring the second pressure drop at the second location (78) in the second section (32) between the first point (54) and the second point (56).

Finally, the method is comprised of the step of using the first pressure drop and the second pressure drop to determine a value for a first characteristic of the fluid (22) and to determine a value for a second characteristic of the fluid (22). As discussed above, when the conduit (24) is comprised of the first and section sections (30, 32) and the method comprises the first and second pressure drop measuring steps, depending upon the specific geometry of the conduit (24) and the composition of the fluid (22) including its viscosity, the first characteristic of the fluid (22) may be one of a flow rate, either volumetric or mass flow rate, of the fluid (22) and a density of the fluid (22), while the second characteristic may be the other of the flow rate and the density of the fluid (22). However, preferably, the first characteristic is one of the flow rate, either volumetric or mass flow rate, of the fluid (22) and a viscosity of the fluid (22), while the second characteristic is the other of the flow rate and the viscosity of the fluid (22).

In addition, preferably the method is comprised of the following further steps: (a) third mixing the fluid (22) as it flows from the first end (60) to the second end (62) of the third section (34) such that the fluid (22) is substantially homogeneous at the first point (64) in the third section (34) and such that the substantial homogeneity of the fluid (22) is maintained between the first point (64) and the second point (66) in the third section (34); and (b) measuring the third pressure drop at the third location (80) of the third section (34) between the first point (64) and the second point (66).

In addition, the method further preferably comprises the step of using the third pressure drop to determine a value for a third characteristic of the fluid (22). As discussed, when the conduit (24) is comprised of the first, second and third sections (30, 32, 34) and the method comprises the first, second and third pressure drop measuring steps, depending upon the specific geometry of the conduit (24) and the composition of the fluid (22) including its viscosity, the first characteristic of the fluid (22) is one of a flow rate, either volumetric or mass flow rate, of the fluid (22), a viscosity of the fluid (22) and a density of the fluid (22). The second characteristic is another of the flow rate of the fluid (22), the viscosity of the fluid (22) and the density of the fluid (22). The third characteristic is the last of the flow rate of the fluid (22), the viscosity of the fluid (22) and the density of the fluid (22).

Further, preferably, each of the first, second and third mixing steps is comprised of continuously mixing the fluid (22) as it flows from the first end (40, 50, 60) to the second end (42, 52, 62). As the first, second and third locations (76, 78, 80) are located in the first, second and third sections (30, 32, 34) respectively between the first point (44, 54, 64) and the second point (46, 56, 66) therein, the mixing of the fluid (22) and the characterization of the fluid (22), by the pressure drop measuring steps and the subsequent steps of using the pressure drops to determine values for the characteristics of the fluid (22), are performed simultaneously or concurrently.

Each of the first, second and third mixing steps is preferably comprised of directing the fluid (22) through the mixer (48, 58, 68) located in each section (30, 32, 34), as described above, to produce the substantially homogeneous fluid (22). Thus, in the preferred embodiment, each mixing step is comprised of disrupting the flow of the fluid (22) through the section (30, 32, 34) by directing the fluid (22) through the packing material in the section (30, 32, 34), preferably being a plurality of hollow, permeable ellipsoidal bodies (82).

Further, each of the first, second and third pressure drop measuring step is preferably comprised of the step of measuring the first, second and third pressure drop of the fluid (22) at the first, second and third locations (76, 78, 80) respectively, which pressure drop is caused by the flow pattern of the fluid (22) at the first, second or third location (76, 78, 80). In the preferred embodiment, the flow pattern is created by the mixer (48, 58, 68). Therefore, each of the measuring steps is comprised of measuring the pressure drop across or through the mixer (48, 58, 68), preferably a static mixer, at each of the first, second and third locations (76, 78, 80).

Once the first and second pressure drops are measured, and preferably the third pressure drop is measured, the pressure drops are used to determine the first and second, and preferably the third, characteristics of the fluid (22), as discussed above, either by applying a theoretical, mathematical model or equation defining the relationship between the pressure drop and the particular characteristic to be determined or by applying empirical test data defining the relationship between the pressure drop and the particular characteristic to be determined. Preferably, calibration test data on the fluid flow should be obtained for the apparatus (20) as such data tends to be more accurate due to the limitations of the mathematical model to take into account the flow phenomenon of the particular apparatus (20) being used.

In the preferred embodiment, the fluid (22) is preferably relatively viscous. In this case, the first pressure drop and the second pressure drop are used to determine a value for the first and second characteristics of the fluid (22), being one each of the flow rate of the fluid (22), volumetric or mass, and the viscosity of the fluid (22). Further, where it is desirable to determine the density of the fluid (22), the third pressure drop is used to determine a value for the third characteristic of the fluid (22), being the density of the fluid (22). Given the viscosity of the fluid (22), the effects of gravitational segregation of the fluid (22) in the conduit (24) can be considered to be negligible in the determination of the values for the first, second and third characteristics.

Specifically, in the preferred embodiment, the first and second pressure drops are used to determine the flow rate and the viscosity of the fluid (22) either by applying a theoretical, mathematical model or equation defining the relationship between the pressure drop and the flow rate or viscosity or by applying empirical test data defining the relationship between the pressure drop and the flow rate or viscosity. Although the volumetric flow rate or the mass flow rate may be determined, preferably the mass flow rate of the fluid (22) is determined. Further, the third pressure drop is used to determine the density by applying a theoretical, mathematical model or equation defining the relationship between the pressure drop and the density or by applying empirical test data defining the relationship between the pressure drop and the density.

More particularly, in the preferred embodiment, the calibration of flow through the horizontal first and second sections (30, 32), having different cross-sectional areas, is represented by the following equations:

$$M_1 = f_1(\Delta p_1, \mu) \quad \text{Equation 1}$$

$$M_2 = f_2(\Delta p_2, \mu) \quad \text{Equation 2}$$

$$M_1 = M_2 = M \quad \text{Equation 3}$$

where, M is the mass flow rate, $\Delta p$ is the measured pressure drop and $\mu$ is the fluid viscosity. $f_1$ and $f_2$ represent the functional relationship between the flow rate and the measured pressure drop determined from the flow calibration. Both flow rate M and fluid viscosity $\mu$ are determinable by iteration using the above equations and the measured pressure drops $\Delta p_1$ and $\Delta p_2$.

If the determination of density $\rho$ is desired for the fluid (22), in the preferred embodiment, the calibration of the third vertical section (34), having a cross-sectional area substantially similar to that of the second section (32), is represented by the following equations:

$$M_3 = f_3(\Delta p_3, \mu, \rho, \Delta h) \quad \text{Equation 4}$$

$$M_3 = M_2 = M \quad \text{Equation 5}$$

where $\Delta h$ is the change in elevation head component of the measured pressure drop $\Delta p_3$.

Although the first, second and third characteristics are preferably determined using the pressure drop measurements and the steps noted above, they may be determined using any process, or combination of processes, suitable for the specific nature and properties of the fluid (22) being measured. Further, as the fluid (22) being characterized is substantially homogeneous fluid, the first, second and third characteristics may be determined using any known process, or combination of processes, able to relatively accurately characterize a single phase fluid as long as it is compatible with, and suitable for, the specific nature and properties of the homogeneous fluid (22) being measured.

The embodiments of the invention in which an exclusive property or privilege is claimed are defined as follows:

1. A method for characterizing a flow of a multi-phase fluid as the fluid flows through a conduit, the conduit comprising a first section and a second section in series, wherein the first section and the second section each have a first end and a second end, the method comprising the steps of:

(a) first mixing the fluid continuously as the fluid flows from the first end to the second end of the first section of the conduit such that the fluid is substantially homogeneous at a first point in the first section and such that the substantial homogeneity of the fluid is maintained between the first point and a second point in the first section, wherein the first point and the second point are located between the first end and the second end of the first section;

(b) measuring a first pressure drop at a first location in the first section of the conduit between the first point and the second point of the first section, wherein the first location has a geometry;

(c) second mixing the fluid continuously as the fluid flows from the first end to the second end of the second section such that the fluid is substantially homogeneous at a first point in the second section and such that the substantial homogeneity of the fluid is maintained between the first point and a second point in the second section, wherein the first point and the second point are located between the first end and the second end of the second section;

(d) measuring a second pressure drop at a second location in the second section of the conduit between the first point and the second point of the second section, wherein the second location has a geometry different from the geometry of the first location; and (e) using the first pressure drop and the second pressure drop to determine a value for a first characteristic of the fluid and to determine a value for a second characteristic of the fluid.

2. The method as claimed in claim 1 wherein the first mixing step is comprised of directing the fluid through at least one in-line mixer located in the first section to produce the substantially homogeneous fluid at the first point in the first section and to maintain the substantial homogeneity of the fluid between the first point and the second point in the first section, and wherein the second mixing step is comprised of directing the fluid through at least one in-line mixer located in the second section to produce the substantially homogeneous fluid at the first point in the second section and to maintain the substantial homogeneity of the fluid between the first point and the second point in the second section.

3. The method as claimed in claim 2 wherein at least one of the first mixing step and the second mixing step is comprised of providing a static mixer such that the in-line mixer is comprised of the static mixer and directing the fluid through the static mixer.

4. The method as claimed in claim 3 wherein each of the first mixing step and the second mixing step is comprised of providing a static mixer such that the in-line mixer is comprised of the static mixer and directing the fluid through the static mixer.

5. The method as claimed in claim 4 wherein the first mixing step is comprised of providing the static mixer in the first section extending substantially between the first end and the second end of the first section and wherein the second mixing step is comprised of providing the static mixer in the second section extending substantially between the first end and the second end of the second section.

6. The method as claimed in claim 5 wherein at least one of the first mixing step and the second mixing step is further comprised of providing a packing material such that the static mixer is comprised of the packing material and directing the fluid through the packing material to disrupt the flow of the fluid through the section.

7. The method as claimed in claim 6 wherein each of the first mixing step and the second mixing step is further comprised of providing a packing material such that the static mixer is comprised of the packing material and directing the fluid through the packing material to disrupt the flow of the fluid through the section.

8. The method as claimed in claim 7 wherein each of the first mixing step and the second mixing step is further comprised of providing a plurality of permeable ellipsoidal bodies such the packing material is comprised of the plurality of permeable ellipsoidal bodies.

9. The method as claimed in claim 7 wherein the first pressure drop measuring step is comprised of measuring the pressure drop through the static mixer at the first location in the first section and wherein the second pressure drop measuring step is comprised of measuring the pressure drop through the static mixer at the second location in the second section.

10. The method as claimed in claim 9 wherein the first pressure drop measuring step and the second pressure drop measuring step are further comprised of providing a change in elevation head component of the first pressure drop which is different from a change in elevation head component of the second pressure drop.

11. The method as claimed in claim 10 wherein the step of using the first pressure drop and the second pressure drop is comprised of determining a value for one of flow rate of the fluid and density of the fluid as the first characteristic and determining a value for the other of flow rate of the fluid and density of the fluid as the second characteristic.

12. The method as claimed in claim 11 wherein each of the first mixing step and the second mixing step is further comprised of providing a plurality of permeable ellipsoidal bodies such the packing material is comprised of the plurality of permeable ellipsoidal bodies.

13. The method as claimed in claim 12 further comprising providing the fluid at a viscosity of less than about 500 centipoise.

14. The method as claimed in claim 9 wherein the first pressure drop measuring step and the second pressure drop measuring step are further comprised of providing a cross-sectional area of the first location which is different from a cross-sectional area of the second location.

15. The method as claimed in claim 14 wherein the step of using the first pressure drop and the second pressure drop is comprised of determining a value for one of flow rate of the fluid and viscosity of the fluid as the first characteristic and determining a value of the other of flow rate of the fluid and viscosity of the fluid as the second characteristic.

16. The method as claimed in claim 15 wherein the first pressure drop measuring step and the second pressure drop measuring step are further comprised of providing neither of the first pressure drop and the second pressure drop with a change in elevation head component.

17. The method as claimed in claim 16 wherein each of the first mixing step and the second mixing step is further comprised of providing a plurality of permeable ellipsoidal bodies such the packing material is comprised of the plurality of permeable ellipsoidal bodies.

18. The method as claimed in claim 17 further comprising providing the fluid at a viscosity of greater than about 500 centipoise.

19. The method as claimed in claim 9 wherein the conduit is further comprised of a third section in series with the first section and the second section, wherein the third section has a first end and a second end, wherein the method further comprises the steps of:

(a) third mixing the fluid continuously as the fluid flows from the first end to the second end of the third section of the conduit such that the fluid is substantially homogeneous at a first point in the third section and such that the substantial homogeneity of the fluid is maintained between the first point and a second point in the third section, wherein the first point and the second point are located between the first end and the second end of the third section;

(b) measuring a third pressure drop at a third location in the third section of the conduit between the first point and the second point of the third section, wherein the third location has a geometry different from the geometry of both the first location and the second location; and (c) using the third pressure drop to determine a value for a third characteristic of the fluid.

20. The method as claimed in claim 19 wherein the third mixing step is comprised of directing the fluid through at least one in-line mixer located in the third section to produce the substantially homogeneous fluid at the first point in the third section and to maintain the substantial homogeneity of the fluid between the first point and the second point in the third section.

21. The method as claimed in claim 20 wherein the third mixing step is comprised of providing a static mixer such that the in-line mixer is comprised of the static mixer and directing the fluid through the static mixer.

22. The method as claimed in claim 21 wherein the third mixing step is comprised of providing the static mixer in the third section extending substantially between the first end and the second end of the third section.

23. The method as claimed in claim 22 wherein the third mixing step is further comprised of providing a packing material such that the static mixer is comprised of the packing material and directing the fluid through the packing material to disrupt the flow of the fluid through the third section.

24. The method as claimed in claim 23 wherein the third pressure drop measuring step is comprised of measuring the pressure drop through the static mixer at the third location in the third section.

25. The method as claimed in claim 24 wherein the step of using the first pressure drop and the second pressure drop is comprised of determining a value for one of flow rate of the fluid, density of the fluid and viscosity of the fluid as the first characteristic and determining a value for another of the flow rate of the fluid, density of the fluid and viscosity of the fluid as the second characteristic, and wherein the step of using the third pressure drop is comprised of determining a value for the last of flow rate of the fluid, density of the fluid and viscosity of the fluid as the third characteristic.

26. The method as claimed in claim 25 wherein the first pressure drop measuring step, the second pressure drop measuring step and the third pressure drop measuring step are comprised of providing a change in elevation head component for at least two of the first pressure drop, the second pressure drop and the third pressure drop which is different, and providing a cross-sectional area for at least two of the first location, the second location and the third location which is different.

27. The method as claimed in claim 26 wherein the step of providing the cross-sectional areas is comprised of providing the cross-sectional area of the first location which is greater than the cross-sectional area of the second location.

28. The method as claimed in claim 27 wherein the step of providing the cross-sectional areas is further comprised of providing the cross-sectional area of the first location which is greater than the cross-sectional area of the third location.

29. The method as claimed in claim 26 wherein the step of providing the change in elevation head component is comprised of orienting two of the first location, the second location and the third location substantially horizontally and orienting one of the first location, the second location and the third location substantially vertically.

30. The method as claimed in claim 29 wherein the step of providing the cross-sectional areas is comprised of providing the cross-sectional area of the substantially vertically oriented location which is substantially the same as the cross-sectional area of one of the substantially horizontally oriented locations.

31. The method as claimed in claim 26 further comprising providing the fluid at a viscosity of greater than about 500 centipoise.

32. The method as claimed in claim 29 wherein each of the first mixing step, the second mixing step and the third mixing step is further comprised of providing a plurality of permeable ellipsoidal bodies such the packing material is comprised of the plurality of permeable ellipsoidal bodies.

33. An apparatus for use in characterizing a flow of a multi-phase fluid, the apparatus comprising:

(a) a conduit comprising a first section and a second section in series, wherein each section has a first end and a second end for flowing the fluid through each section in series from the first end to the second end, and wherein the first section and the second section each have a first point and a second point located between the first end and the second end;

(b) a first mixer for mixing the fluid continuously as the fluid flows from the first end to the second end of the first section such that the fluid is substantially homogeneous at the first point in the first section and such that the substantial homogeneity of the fluid is maintained between the first point and the second point in the first section;

(c) a first pressure drop measuring device at a first location in the first section between the first point and the second point of the first section, wherein the first location has a geometry;

(d) a second mixer for mixing the fluid continuously as the fluid flows from the first end to the second end of the second section such that the fluid is substantially homogeneous at the first point in the second section and such that the substantial homogeneity of the fluid is maintained between the first point and the second point in the second section; and (e) a second pressure drop measuring device at a second location in the second section between the first point and the second point of the second section, wherein the second location has a geometry different from the geometry of the first location.

34. The apparatus as claimed in claim 33 wherein the first mixer is comprised of at least one in-line mixer located in the first section and wherein the second mixer is comprised of at least one in-line mixer located the second section.

35. The apparatus as claimed in claim 34 wherein the in-line mixer in at least one of the first section and the second section is comprised of a static mixer.

36. The apparatus as claimed in claim 35 wherein the in-line mixer in each of the first section and the second section is comprised of a static mixer.

37. The apparatus as claimed in claim 36 wherein the static mixer in the first section extends substantially between the first end and the second end of the first section and wherein the static mixer in the second section extends substantially between the first end and the second end of the second section.

38. The apparatus as claimed in claim 37 wherein the static mixer in at least one of the first section and the second section is comprised of a packing material for disrupting the flow of the fluid through the section.

39. The apparatus as claimed in claim 37 wherein the static mixer in each of the first section and the second section is comprised of a packing material for disrupting the flow of the fluid through the section.

40. The apparatus as claimed in claim 39 wherein the packing material is comprised of a plurality of permeable ellipsoidal bodies.

41. The apparatus as claimed in claim 39 wherein the first pressure drop measuring device measures the pressure drop through the static mixer at the first location and wherein the second pressure drop measuring device measures the pressure drop through the static mixer at the second location.

42. The apparatus as claimed in claim 41 wherein the first pressure drop measuring device is comprised of a differential pressure device located at the first location and wherein the second pressure drop measuring device is comprised of a differential pressure device located at the second location.

43. The apparatus as claimed in claim 42 wherein each of the first location and the second location has a different orientation relative to gravity.

44. The apparatus as claimed in claim 42 wherein each of the first location and the second location has a cross-sectional area and wherein the cross-sectional area of the first location is different from the cross-sectional area of the second location.

45. The apparatus as claimed in claim 44 wherein the first location and the second location are substantially horizontally oriented.

46. The apparatus as claimed in claim 45 wherein the packing material is comprised of a plurality of permeable ellipsoidal bodies.

47. The apparatus as claimed in claim 39 wherein the apparatus is further comprised of:

(a) the conduit comprising a third section in series with the first and second sections, wherein the third section has a first end and a second end for flowing the fluid through the third section from the first end to the second end, and wherein the third section has a first point and a second point located between the first end and the second end;

(b) a third mixer for mixing the fluid continuously as the fluid flows from the first end to the second end of the third section such that the fluid is substantially homogeneous at the first point in the third section and such that the substantial homogeneity of the fluid is maintained between the first point and the second point in the third section;

(c) a third pressure drop measuring device at a third location in the third section between the first point and the second point of the third section, wherein the third location has a geometry different from the geometry of both the first location and the second location.

48. The apparatus as claimed in claim 47 wherein the third mixer is comprised of at least one in-line mixer located in the third section.

49. The apparatus as claimed in claim 48 wherein the in-line mixer in the third section is comprised of a static mixer.

50. The apparatus as claimed in claim 49 wherein the static mixer in the third section extends substantially between the first end and the second end of the third section.

51. The apparatus as claimed in claim 50 wherein the static mixer in the third section is comprised of a packing material for disrupting the flow of the fluid through the third section.

52. The apparatus as claimed in claim 51 wherein the third pressure drop measuring device measures the pressure drop through the static mixer at the third location.

53. The apparatus as claimed in claim 52 wherein the first location, the second location and the third location each has a cross-sectional area, wherein the orientation relative to gravity of at least two of the first location, the second location and the third location is different, and wherein the cross-sectional area for at least two of the first location, the second location and the third location is different.

54. The apparatus as claimed in claim 53 wherein the cross-sectional area of the first location is greater than the cross-sectional area of the second location.

55. The apparatus as claimed in claim 54 wherein the cross-sectional area of the first location is greater than the cross-sectional area of the third location.

56. The apparatus as claimed in claim 53 wherein two of the first location, the second location and the third location are substantially horizontally oriented and wherein one of the first location, the second location and the third location is substantially vertically oriented.

57. The apparatus as claimed in claim 56 wherein the cross-sectional area of the substantially vertically oriented location is substantially the same as the cross-sectional area of one of the substantially horizontally oriented locations.

58. The apparatus as claimed in claim 57 wherein the packing material is comprised of a plurality of permeable ellipsoidal bodies.

* * * * *